(12) United States Patent
Terry et al.

(10) Patent No.: US 7,347,674 B2
(45) Date of Patent: Mar. 25, 2008

(54) PUMP

(75) Inventors: Sean Roderick Terry, Richmond (AU);
Mark Andrew Lance, Williamstown (AU)

(73) Assignee: Davey Products Pty Ltd, Victoria (AU)

( * ) Notice: Subject to any disclaimer, the term of this patent is extended or adjusted under 35 U.S.C. 154(b) by 501 days.

(21) Appl. No.: 10/471,619

(22) PCT Filed: Mar. 8, 2002

(86) PCT No.: PCT/AU02/00270

§ 371 (c)(1),
(2), (4) Date: Sep. 12, 2003

(87) PCT Pub. No.: WO02/073040

PCT Pub. Date: Sep. 19, 2002

(65) Prior Publication Data

US 2004/0091373 A1    May 13, 2004

(30) Foreign Application Priority Data

Mar. 13, 2001    (AU) .................................... PR3699

(51) Int. Cl.
*F04B 17/00*    (2006.01)
*F04B 35/00*    (2006.01)
*F04B 35/04*    (2006.01)

(52) U.S. Cl. ...................... 417/367; 417/368; 417/369; 417/370; 417/423.1

(58) Field of Classification Search .................. 310/54, 310/58, 52, 53; 417/366, 367, 369, 370, 417/423.1; 415/169.1; 219/543, 548
See application file for complete search history.

(56) References Cited

U.S. PATENT DOCUMENTS

| 2,321,126 | A | * | 6/1943 | Breuer ........................ 417/367 |
| 2,699,642 | A | | 1/1955 | Ahlen .......................... 165/51 |
| 2,731,918 | A | * | 1/1956 | Schaefer ...................... 417/363 |
| 2,784,672 | A | * | 3/1957 | Wallace ....................... 417/370 |
| 3,294,025 | A | * | 12/1966 | Niemeyer et al. ........ 210/416.4 |
| 3,790,309 | A | * | 2/1974 | Volz ............................ 417/368 |
| 3,870,438 | A | * | 3/1975 | Dannenmann et al. ...... 417/356 |

(Continued)

FOREIGN PATENT DOCUMENTS

EP    0 013 869 A1    8/1980

(Continued)

OTHER PUBLICATIONS

Derwent Abstact Accession No. 84-035760/06, SU 1006494A (USKOV) (1983).

*Primary Examiner*—Devon C. Kramer
*Assistant Examiner*—Jessica L Frantz
(74) *Attorney, Agent, or Firm*—Birch, Stewart, Kolasch & Birch, LLP

(57) ABSTRACT

A fluid pump of the type in which a housing assembly has a first sub-housing having an electric motor therein which is in line with a second sub-housing having the impeller therein, with the motor having a rotor shaft which extends through a seal of the first sub-housing into the second sub-housing and with the impeller mounted on the rotor shaft so as to be rotatable by the motor, and the second sub-housing having inlet and outlet ports through which fluid, such as water, is able to be pumped through the second sub-housing.

35 Claims, 10 Drawing Sheets

U.S. PATENT DOCUMENTS

| | | | |
|---|---|---|---|
| 4,778,354 A * | 10/1988 | Idei | 417/366 |
| 5,038,853 A | 8/1991 | Callaway, Sr. et al. | |
| 5,221,191 A * | 6/1993 | Leyderman et al. | 417/312 |
| 5,332,369 A * | 7/1994 | Jensen | 417/369 |
| 5,363,674 A | 11/1994 | Powell | |
| 5,547,341 A | 8/1996 | Amin | |
| 5,605,444 A | 2/1997 | Paton et al. | |
| 5,616,973 A * | 4/1997 | Khazanov et al. | 310/54 |
| 5,888,053 A * | 3/1999 | Kobayashi et al. | 417/244 |
| 5,930,852 A * | 8/1999 | Gravatt et al. | 4/541.1 |
| 6,046,438 A | 4/2000 | Slegt | 219/441 |

FOREIGN PATENT DOCUMENTS

| | | |
|---|---|---|
| EP | 0 661 793 B1 | 7/1995 |
| GB | 2 328 719 A | 3/1999 |
| JP | 10-054390 A | 2/1998 |
| WO | WO 94/25808 A1 | 11/1994 |

* cited by examiner

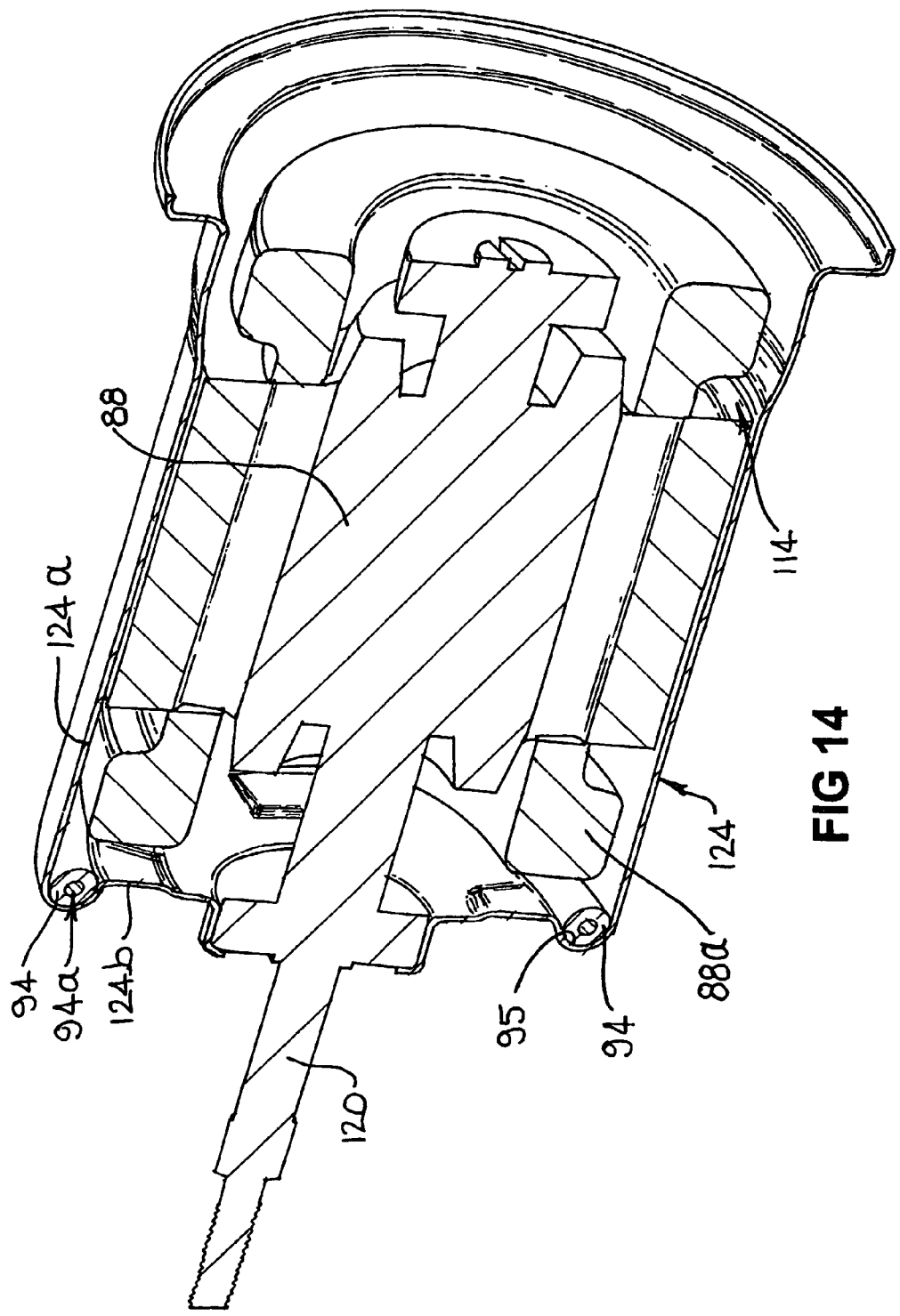

PUMP

BACKGROUND ART

The improvements of the present application relate principally, but not exclusively, to fluid pumps of a type in which a housing assembly has a first sub-housing having an electric motor therein which is in line with a second sub-housing having an impeller therein, with the motor having a rotor shaft which extends through a seal of the first sub-housing into the second sub-housing and with the impeller mounted on the rotor shaft so as to be rotatable by the motor. The second sub-housing has inlet and outlet ports through which fluid, such as water, is able to be pumped through the second sub-housing.

Fluid pumps of the type described are suitable for pumping water to the jets of a spa-bath or spa-pool installation, or for meeting the requirements for water pumping for a swimming pool. The present improvements are suitable for such applications, although they also can be used in other suitable installations.

DISCLOSURE OF THE INVENTION

In a first aspect of the present application, there is provided an impeller suitable for use in a fluid pump of the type described, although the impeller is able to be used in other forms of pump. The impeller has a first and a second annular plate which are axially spaced and, located between the plates, an angularly spaced array of vanes. The impeller also includes a central hub which is within and radially spaced from the inner periphery of the first annular plate, and by which the impeller is mountable on a shaft for rotation therewith. A plurality of circumferentially spaced connectors, extending between the first annular plate and an outer peripheral surface of the hub, secure the hub in relation to the first plate, while an annular array of openings between the inner edge of the first plate and the hub and between successive connectors enable fluid to be pumped to be drawn therethrough and into the space between the plates.

The impeller may be made of any suitable moldable or castable material, such as a metal or a plastics material. The impeller may be of integral form, although it may achieve that form by at least two separately formed component parts being welded or bonded together. In one suitable arrangement, the impeller is made of a suitable plastics material, with component parts being made integral by ultrasonic welding.

The first plate and the hub may be integrally formed, with the second plate made separately. The vanes provided between the plates may be formed integrally with either plate. However, in a preferred form of the impeller, the second plate preferably is flat with the first plate being of shallow frusto-conical form such that the spacing between the plates decreases towards the outer periphery of the impeller. Particularly with that form, the vanes preferably are formed integrally with the first plate, with the second plate then being welded or bonded to an edge of each vane remote from the first plate.

The impeller need not be of integral form. In one suitable form, it is made of at least two separately formed component parts which are secured together by a suitable engagement therebetween. In one suitable form, the impeller is made of a suitable stiff material which has sufficient resilience to enable component parts to be secured together by a firm snap-fit therebetween. Thus, for example, the second plate may have a plurality of axially extending fingers which extend away from its inner periphery and which, with the second plate presented axially to the first plate, engage behind a shoulder or ledge defined by the hub and thereby secure the first and second plates in opposed relationship.

The vanes located between the plates may be arcuate so as to extend outwardly in a spiral array. These vanes are operable to enhance centrifugal force imparting velocity to a fluid being pumped outwardly between the outer periphery of the plates.

The connectors may extend substantially radially between the inner periphery of the first plate and the outer surface of the hub. Each connector may be in the form of an inlet vane, although the array of inlet vanes preferably has a neutral effect on fluid being pumped through the openings towards the second plate. Within the spacing between the plates, fluid moves axially and then radially outwardly by a pressure differential between the eye of the impeller at the connectors and the outer periphery of the plates.

The hub may have a central boss by which the impeller is mountable on a shaft. Radially outwardly from the boss, the hub may have a peripheral skirt which defines the outer surface at which the hub is secured in relation to the first plate by the connectors. The skirt preferably flares from an end of the boss located beyond the first plate, in an axial direction away from the second plate. At that end of the boss, the hub may have a convex, preferably part-spherical, surface which assists in guiding fluid in its flow through the eye of the impeller.

The hub, at the other end of the boss, may terminate intermediate the first and second plate. In such case, the skirt of the hub may extend a short distance beyond the other end of the boss, to enable a seal provided on the shaft to be received in, and provide a seal around an inner peripheral surface of, the skirt. The boss has a bore extending axially from its other end, for receiving the shaft, and the bore may be a blind bore.

Around the inner periphery of the first plate, there may be an annular skirt which extends axially away from the second plate. The skirt defines an inlet guide for fluid being drawn through the eye of the impeller. The inner surface of the skirt preferably is opposed to part of the outer peripheral surface of the hub.

For some applications, the second plate may have an inner periphery at which, with the impeller mounted on a shaft, a fluid seal is provided by a seal provided on the shaft. However, for a principal application, the impeller is intended to be mountable on a shaft with the inner periphery of the second plate defining an annular clearance around the shaft and any seal on the shaft adjacent to the second plate. As a consequence, fluid is able to flow into the space between the plates, axially of the impeller, from a surface of the second plate which is remote from the first plate. The reason for this will become clear from subsequent description herein.

Particularly where the inner periphery of the second plate is to define such a clearance around the shaft, there may be an annular spigot or fin which projects axially from the remote surface of the second plate, away from the first plate. The spigot or fin is disposed concentrically with respect to the inner periphery of the second plate, but preferably is spaced outwardly therefrom but inwardly with respect to the outer periphery of the second plate. The purpose of this spigot or fin also will become clear from subsequent description herein.

In a second aspect of the present application, there is provided a fluid pump of the type described, wherein the first sub-housing containing the motor is of double-walled construction enabling fluid cooling of the motor. The double-walled construction is provided by a motor casing which houses the stator and rotor shaft of the motor and, spaced from and enclosing the motor casing, an outer shell. Within a chamber of the first sub-housing defined between the casing and shell, there is provided a plurality of elongate baffles for guiding cooling fluid for flow over a major part of the external surface of the casing whereby the operating temperature of the motor is able to be controlled by heat energy extracted by the fluid from the casing.

The baffles may be of a form providing for a flow of cooling fluid along substantially the full axial length of the motor casing. The flow preferably is from a first end of the first sub-housing adjacent to the second sub-housing, along the casing to its second end and then back along the casing to the first end. To enable this flow, there are alternating longer and shorter baffles, with the longer baffles extending at least to the second end of the casing and the shorter baffles terminating short of the longer baffles at that second end. Thus, cooling fluid is able to flow to the second end of the casing between alternate pairs of baffles, and then pass around the end of each shorter baffles of each pair for return flow to the first end of the casing between next adjacent pairs of baffles.

The chamber of the first sub-housing, defined between the casing and the shell may extend radially inwardly of the casing, towards the rotor shaft, at the first end of the first sub-housing. The baffles may have lateral portions, which extend across that end of the casing from their main longitudinal extent, such as to a central boss through which the shaft extends. Thus, the cooling fluid is able to extract that energy from the casing at the first end, as well as from substantially the full length of casing, to enhance overall heat extraction. Similarly, the chamber and the baffles may extend radially inwardly of the casing, towards the shaft, at the second end of the casing, to further enhance heat extraction. However, this latter arrangement can complicate the fitting and electrical isolation of power supply to the motor, which preferably is at the second end. Thus, rather than provide for cooling at the second end, there preferably is an annular, fluid-tight seal between the casing and shell at the second end.

To enable the required flow of cooling fluid, inlet and outlet ports relative for the chamber provide communication between the interior of the impeller sub-housing and the chamber. The inlet ports are provided at a higher pressure region of the impeller sub-housing, while the outlet ports are provided at a lower pressure region of that sub-housing, whereby a pressure differential prevailing in the impeller sub-housing provides the force necessary to drive the cooling fluid into and along the chamber from the first to the second end of the motor sub-housing, and then back to the first end for return to the impeller sub-housing. Preferably the inlet ports are disposed radially outwardly with respect to the outlet ports.

The number, size and radial location of the inlet and outlet ports enabling the flow of cooling fluid are chosen to satisfy a number of conditions. A first condition is attainment of a sufficient pressure differential between the inlet and outlet ports to achieve a flow of cooling fluid providing a suitable level of heat energy extraction from the motor casing for maintaining the motor at an efficient operating temperature. A second requirement is to ensure flow through each port which avoids undue generation of noise and vibrations. For the latter purpose, the ports preferably are of a form free of sharp edges, while they also may have tubular extensions which project from a wall in which the ports are provided.

The flow of cooling fluid may be sufficient to enable the motor to be maintained at an efficient operation temperature. However, the motor preferably includes means for stirring or circulating air in the motor casing around and through the motor, to assist in maintaining all parts of the motor at a relatively uniform temperature and, hence, to minimize generation of hot spots. The means for circulating the air may include formations on the rotor coil and/or the rotor shaft which are shaped to generate air circulation. The formations may be provided at one end of the motor to stir the air at one end of the motor, or air may be stirred by respective formations at each end of the motor. However, where provided at each end, the respective formations may co-operate by generating air flow in the motor casing, such as in each acting to cause the air to flow in one axial direction between the rotor and stator and in the opposite axial direction between the stator and the motor casing.

The impeller may be configured so as to co-operate with a surface of the second sub-housing to assist in maintaining the pressure differential between the higher and lower pressure regions. For this purpose, the impeller may have an annular spigot or fin which axially overlaps with and is closely adjacent to an annular spigot or fin of the second sub-housing. However, instead of having a spigot or fin, one or each of the impeller and second sub-housing may have a stepped surface which defines an annular face which axially overlaps and is closely adjacent to an annular face, spigot or fin of the other. Such co-operation preferably is between a transverse wall of the second sub-housing which is adjacent to the first sub-housing and a face of the impeller opposed to the transverse wall.

The impeller, for the fluid pump of the second aspect, may be one according to the first aspect. Preferably that impeller has inlet vanes as detailed above, while its second plate preferably may have an annular spigot or fin as detailed above. Where the impeller has such spigot or fin, the impeller is disposed in the impeller sub-housing with the spigot or fin of its second plate projecting towards and closely adjacent to a partition wall which separates the sub-housings and in which the inlet and outlet ports are provided. The arrangement is such that the spigot or fin separates, or assists in separating, the above-mentioned higher and low pressure regions of the impeller sub-housing.

Where the impeller has a spigot or fin on its second plate separating or assisting in separating the pressure regions, the partition wall may have an annular spigot or fin which co-axially overlaps with the impeller spigot or fin. The respective spigots or fins may be in sliding contact in a manner not significantly retarding rotation of the impeller. However, there preferably is a slight clearance between the spigots or fins, with this being such as to maintain the pressure differential between the higher and lower pressure regions. Also, in such arrangement, the impeller may be of a form, as described above, in which the inner periphery of the second plate defines a clearance around the shaft, and around any seal on the shaft adjacent to the second plate. Thus cooling fluid, for controlling the operating temperature of the motor, is able to circulate along the motor casing as described, by passing from a higher pressure region adjacent the outer periphery of the impeller, via inlet ports located radially outwardly of the spigots or fins, and returning via the outlet ports, inwardly of the spigots or fins, so as to pass into the space between the impeller plates via the lower pressure region and the clearance.

As indicated above, the baffles may have lateral portions which extend to a central boss through which the shaft extends. The boss may extend between an end wall of the motor casing and an end wall of the outer shell at the end of the sub-housing. The boss may be integral with the end wall of the shell. The end wall of the outer shell may comprise the above-mentioned partition wall. However, an alternative arrangement is preferred.

In the preferred arrangement, the first sub-housing has a transverse vent which is located at the end of the first sub-housing adjacent to the second sub-housing. The vent opens to one side, preferably to each of opposed sides, of the first sub-housing and is located between a respective end wall of the outer-shell of the first sub-housing and of the motor casing. The vent is defined by the end wall of the outer shell, a transverse pair of opposed side wall members and a transverse basal wall member which extends between the side wall members. The shaft extends from the motor casing between the side walls and through the basal and end walls.

The end wall of the outer shell may comprise a partition wall which separates the sub-housings. In any event, a seal is provided on the shaft to at least minimize leakage of fluid along the shaft from the second sub-housing. The seal for this purpose may be housed in an annular spigot projecting axially from the outer shell end wall towards or within the second sub-housing. With appropriate orientation of the fluid pump in use, the vent enables any fluid which does leak from the second sub-housing or from the chamber of the first sub-housing to drain under gravity away from the shaft, thereby minimizing the risk of fluid passing along the shaft to the motor housing. The appropriate orientation is with the shaft extending horizontally and the vent disposed vertically and opening below the pump. Where the vent is open at each of its ends, it serves the added function of enabling air-circulation around the portion of the shaft extending across the vent.

The lower end of the vent preferably is plumbed to waste. This is desirable, since recommended practice of mounting spa pumps in a drainage tray rarely is followed. In one form, a fitting such as an L-shaped connector is coupled to the lower end of the vent, to receive any fluid passing into the vent, with a hose or conduit providing communication between the fitting and a drain pipe.

The side walls and the basal wall of the vent preferably are formed integrally with the end wall of the outer shell of the first sub-housing. The basal wall defines a central opening to enable the shaft to extend therethrough. Around that opening, at its face remote from the end wall of the outer shell, the basal wall may define an annular spigot with which a corresponding spigot on the end wall of the motor casing co-axially overlaps. A seal is provided between the overlapping spigots, with the spigot of the basal wall preferably receiving therein the spigot of the casing end wall. Also, a bearing for the shaft preferably is housed within the overlapping spigots.

In a third aspect of the present application, there is provided a fluid pump of the type described wherein the second sub-housing, having the impeller therein, includes an inlet connector for coupling the pump to a supply conduit from a source of fluid to be pumped, and an outlet connector for coupling the pump to a return conduit. Each connector communicates with the interior of the second sub-housing and is adapted to provide releasable coupling to the respective conduit. For this purpose, each connector defines a bore extending between the interior of the second sub-housing and an outer end of the connector. An end portion of the conduit for each connector is receivable in the bore, either as a neat sliding fit or with a slight clearance. At the outer end of each connector, the bore is of larger size to define a seat against which a resilient seal is locatable, around the conduit. A respective gland-type of nut on each conduit is engageable with an external thread formed on each connector such that, on tightening each nut, the respective seal is able to be compressed to secure the conduit in relation to the connector and provide a fluid tight seal therebetween.

The connectors may be disposed with their bores extending in substantially parallel relationship, an arrangement which allows there to be some misalignment in the conduits, without leakage. The bores preferably are substantially parallel to the rotor axis. Most conveniently, the connectors extend from the second sub-housing in a direction away from the first sub-housing. The outlet connector preferably communicates with the interior of the second sub-housing with its bore substantially in line with the outer periphery of the impeller. The bore of the inlet connector may be similarly aligned with the outer periphery of the impeller. However, fluid flow from inlet connector to the interior preferably is via a lateral opening from its bore such that fluid passes to a central region of the impeller.

The fluid pump of the third aspect of the application may have the features of a fluid pump according to the second aspect described above. That is, the first sub-housing containing the motor may be of double-walled construction, with baffles within a chamber defined by the walls of that sub-housing enabling the guidance of cooling fluid for controlling the operating temperature of the motor. Also, in line with a preferred form of the second aspect, the pump of the third aspect preferably has an impeller according to the first aspect. Thus, there is envisaged a fluid pump according to the third aspect which has an impeller according to the first aspect, with this pump preferably also having features of the pump of the second aspect.

In each of the second and third aspect, the pump may include a heating device in the first sub-housing by which cooling fluid circulated therethrough is able to be heated to a required degree. That is, in addition to taking up heat energy from the motor, the fluid can be further heated such as to maintain fluid circulated by the pump at a required temperature level. The heater device may be mounted in the motor casing and, in one preferred form, it comprises a substrate of a suitable steel, such as stainless steel, with the substrate having ceramic overlay on which a heating element and control circuitry is provided, such as by printing. Alternatively, such overlay, with the heating element and circuitry, may be formed directly onto the motor casing.

The pump of the present invention may have an electrical enclosure at the end of the first sub-chamber which is remote from the second sub-chamber. That enclosure houses electrical components and terminals by which electric power is supplied to the motor. The enclosure needs to be isolated from the first sub-housing to prevent cooling fluid from passing from the second sub-housing to the enclosure. Where the second sub-housing is of double-walled construction provided by a motor casing and an outer shell, a seal, such as an O-ring seal, may be provided at that remote end to provide a seal between the casing and shell, around an end wall of the second sub-housing at the remote end. However, there preferably also is an annular channel, preferably integrally formed with the end wall which co-operates with the casing and shell to form an annular drainage chamber which receives any fluid which passes the seal. At its lower extent, the chamber preferably has at least one drainage port from which fluid received in the chamber is able to discharge to the exterior of the pump.

BRIEF DESCRIPTION OF THE DRAWINGS

Reference now is directed to the accompanying drawings, in which:

FIG. 14 is a sectional view of the casing of FIG. 13, showing the second modified arrangement enabling heating in relation to a pump motor.

DETAILED DESCRIPTION OF THE INVENTION

Figure 1:
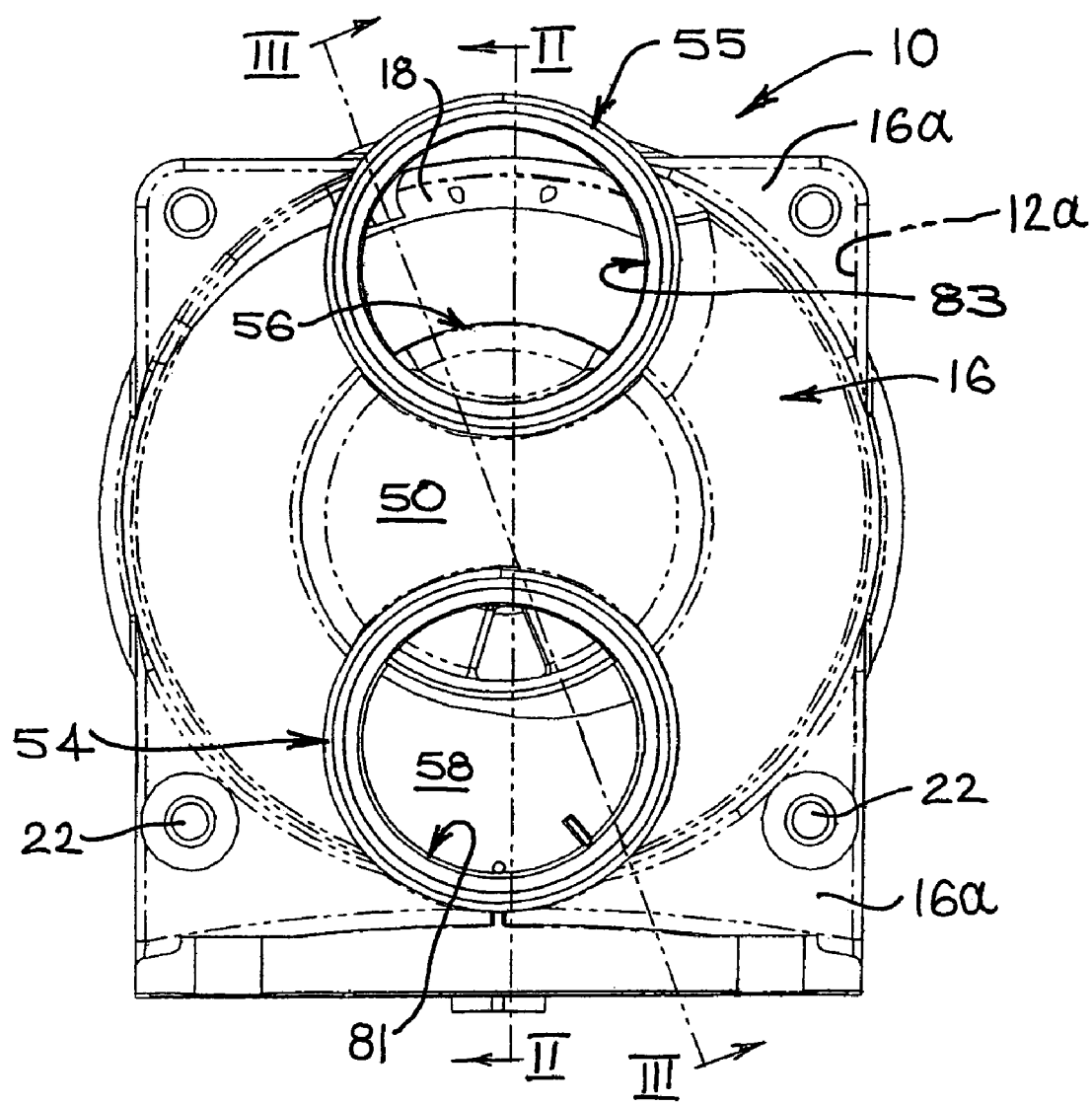
FIG. 1 is an end elevation of a pump according to each of the second and third aspects detailed above, incorporating an impeller according to the first aspect.
Figure 2:
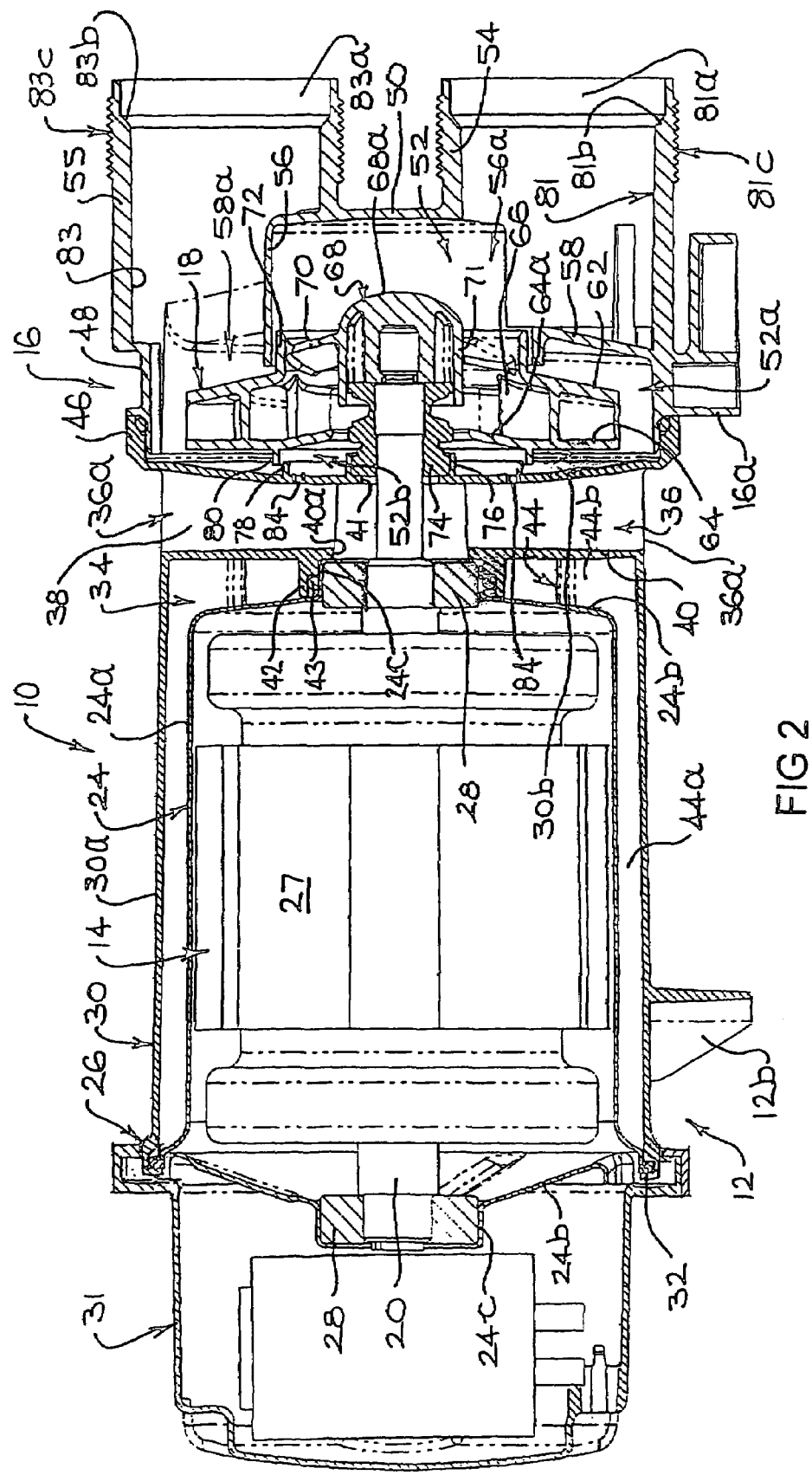
FIG. 2 is a sectional view of the pump, taken on line C-C II-II of FIG. 1.
Figure 3:
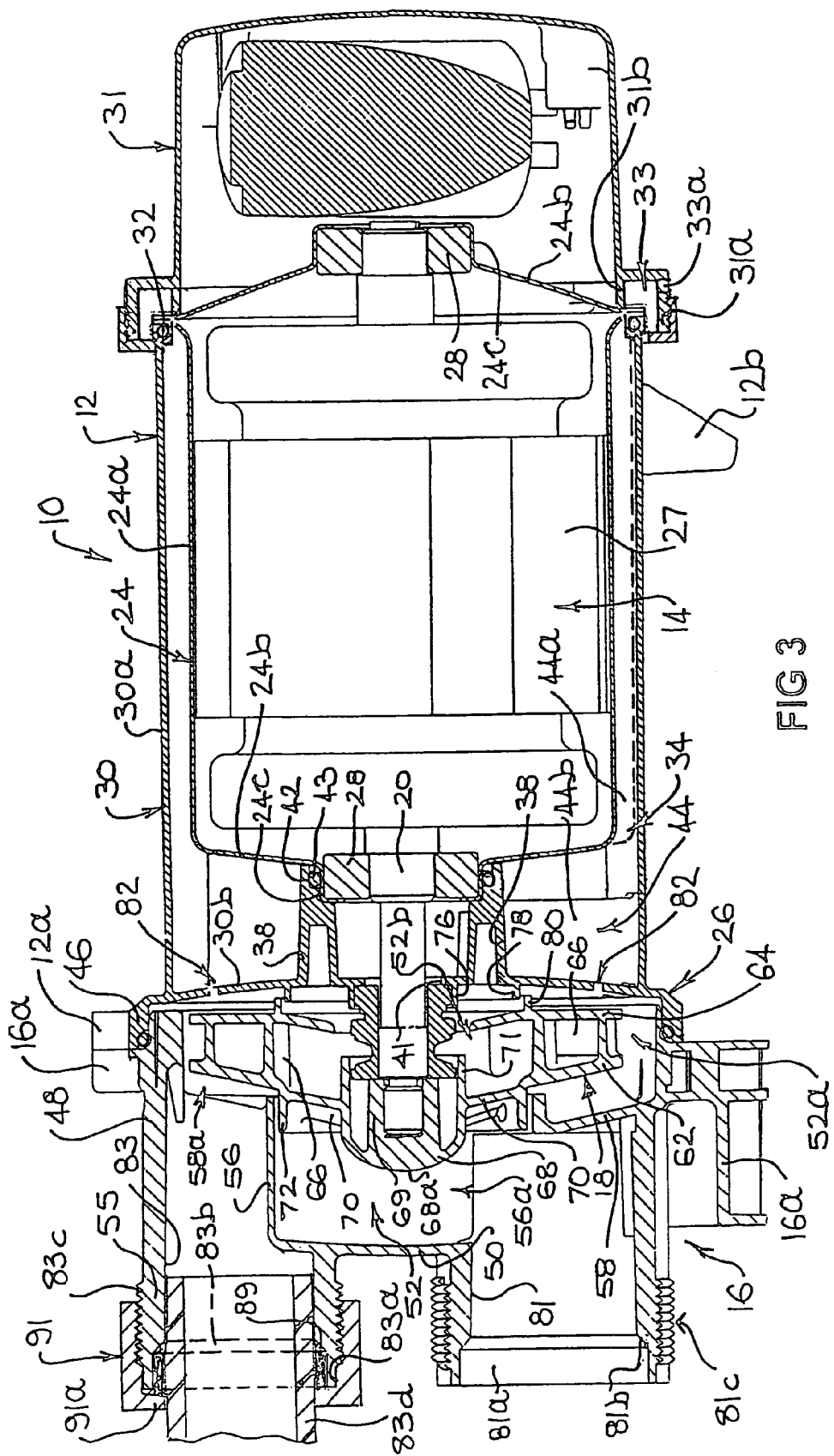
FIG. 3 is a similar view to FIG. 2, but is taken on line F-F III-III of FIG. 1.
Figure 4:
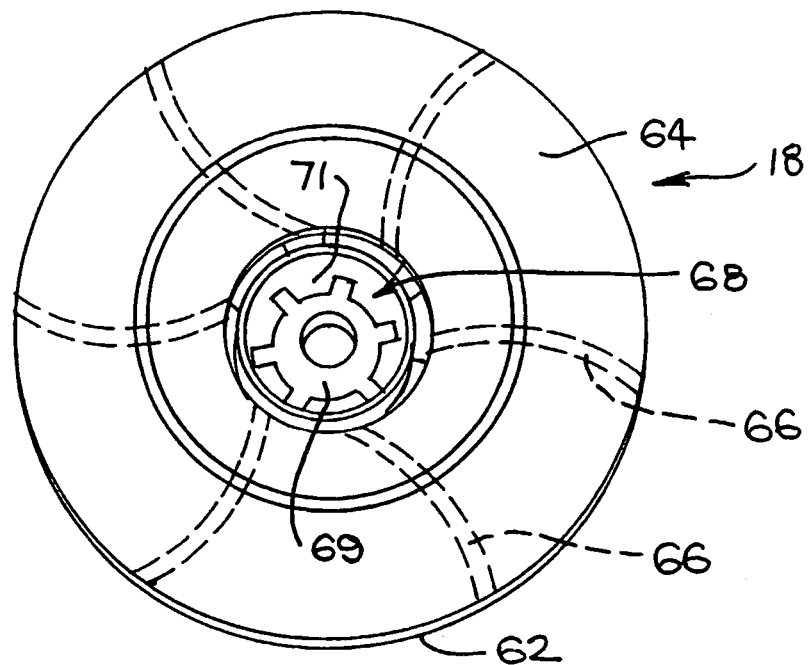
FIG. 4 is a perspective view of the impeller of the pump of FIG. 1.
Figure 5:
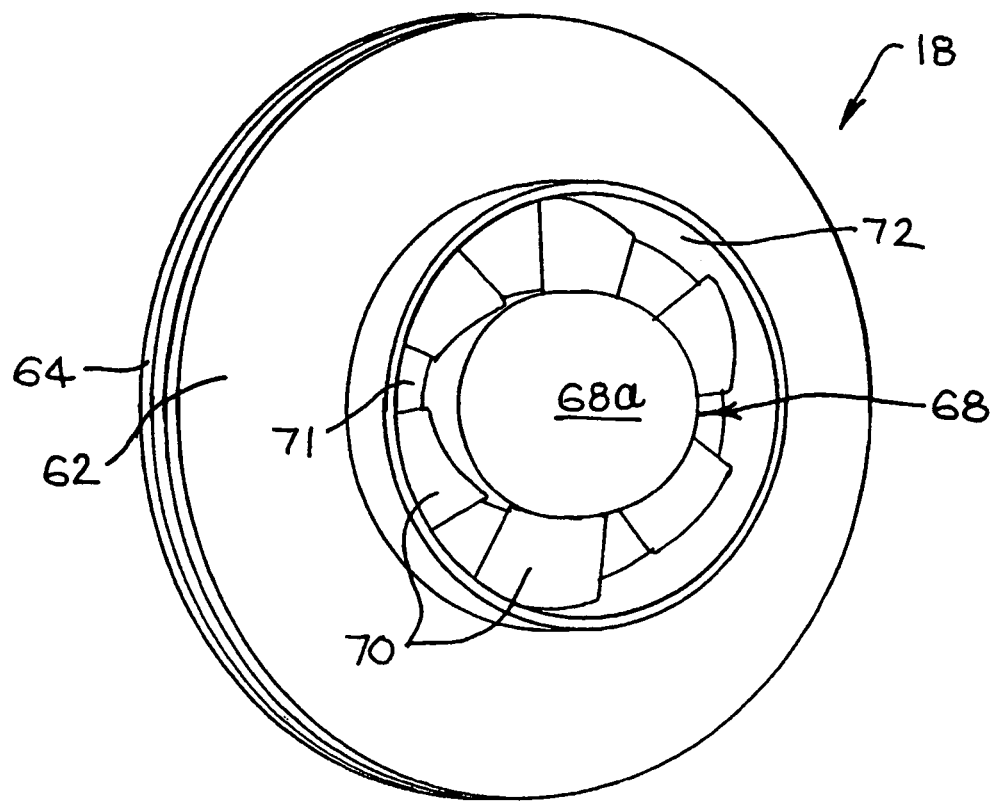
FIG. 5 is a perspective view of the impeller shown in FIG. 4, but taken from the opposite axial end.

Referring first to FIGS. 1 through 3, the pump 10 shown therein has a first sub-housing 12 in which an electric motor 14 is mounted, and a second sub-housing 16 in which an impeller 18 is mounted on a rotor shaft 20 of motor 14. The sub-housings 12, 16 are axially in-line. Also the pump 10 is of cylindrical form overall. However, as can be appreciated from FIG. 1, sub-housings 12 and 16 are coupled together by bolts 22 through respective rectangular end flanges 12*a* and 16*a*. Flange 16*a* provides a first stand on which the pump 10 is supportable in its in-use orientation shown in FIG. 2, while the remote end of sub-housing 12 has a bracket 12*b* for further supporting pump 10 in that orientation.

The sub-housing 12 includes an inner motor casing 24 in which motor 14 is located, and an outer shell 26. The casing 24 is of metal, preferably of good thermal conductivity, and conforms relatively closely to the form of motor 14. Thus a cylindrical central section 24*a* of casing 24 conforms closely to the external form of the stator 27 of motor 14. Also, casing 24 at each end 24*b* thereof defines an axially extending spigot 24*c* through which rotor shaft 20 of motor 14 extends. Shaft 20 is journalled in a respective bearing 28 mounted in each spigot 24*c*.

Outer shell 26 of sub-housing 12 may be of any suitable material, but preferably is of a suitable plastics material. Shell 26 is of two part constructions providing a main part 30 and an end cap 31 which interfit a short distance beyond bracket 12*b*. As shown, the interfit therebetween is around the adjacent end of region 24*b* of casing 24, and provides accommodation for a resilient O-ring seal 32 which seals the interior of cap 31 from the interior of main part 30.

As indicated later herein, cooling fluid is circulated through chamber 34 to control the operating temperature of motor 14. The seal 32 isolates the interior of cap 31 from the interior of the main part 30 of sub-housing 12. However, given that presence of cooling fluid, the junction of cap 31 and shell 26 of sub-housing 12 defines a channel 33 into which is received any fluid which passes seal 32. The channel 33 is of annular form, with the opening of that form upper-most, such that it is visible only in the lower part of each of FIGS. 2 and 3. The channel 33 is defined by concentric flanges 31*a* and 31*b* of cap 31 which bridge seal 32 and provide a seal thereacross. Fluid, such as water, received into channel 33 is able to drain under gravity to the lower extent of channel 33, and then is able to drain exteriorly of pump 10 through drain hole 33*a*.

The main part 30 of shell 26 has a cylindrical peripheral wall 30*a*. Also, extending across the end of wall 30*a* adjacent to sub-housing 16, shell 26 has an end wall 30*b* which provides a partition between sub-housings 12 and 16. Wall 30*a* is spaced radially outwardly from section 24*a* of motor casing 24, while end wall 30*b* is spaced axially beyond the adjacent end 24*b* of casing 24. Thus a chamber 34 is defined between part 30 and casing 24 which extends axially from seal 32 towards sub-housing 16 and, adjacent to sub-housing 16, radially inwardly between end wall 30*b* and the adjacent end 24*b* of casing 24.

As shown most clearly in FIG. 2, the main part 30 of shell 26 defines a vertical vent 36 which is open at the top and bottom of sub-housing 12. The vent 36 is formed by end wall 30*b*, a parallel pair of transverse walls 38 and, joining edges of walls 38 remote from wall 30*b*, a transverse wall 40 which is substantially parallel to wall 30*b*. The vent 36 is open at its ends by virtue of respective openings 36*a* in main part 30 of shell 26.

From the end of motor casing 24 nearer to second sub-housing 16, the rotor shaft 20 extends through opening 40*a* in wall 40. Beyond opening 40*a*, shaft 20 extends between walls 38 from each of which it is spaced, and through opening 41 in end wall 30*b* into sub-housing 16. As shown, walls 38 and 40 are formed integrally with main part 30 of shell 26, as is a spigot 42 which projects from the surface of wall 40 remote from wall 30*b*. The spigot 42 is co-axial with opening 40*a*, and receives therein the end spigot 24*c* of casing 24 which is nearer to sub-housing 16. The inner circumference of spigot 42 is stepped, to accommodate a resilient O-ring seal 43 therein, around that spigot 24*c*.

Figure 6:
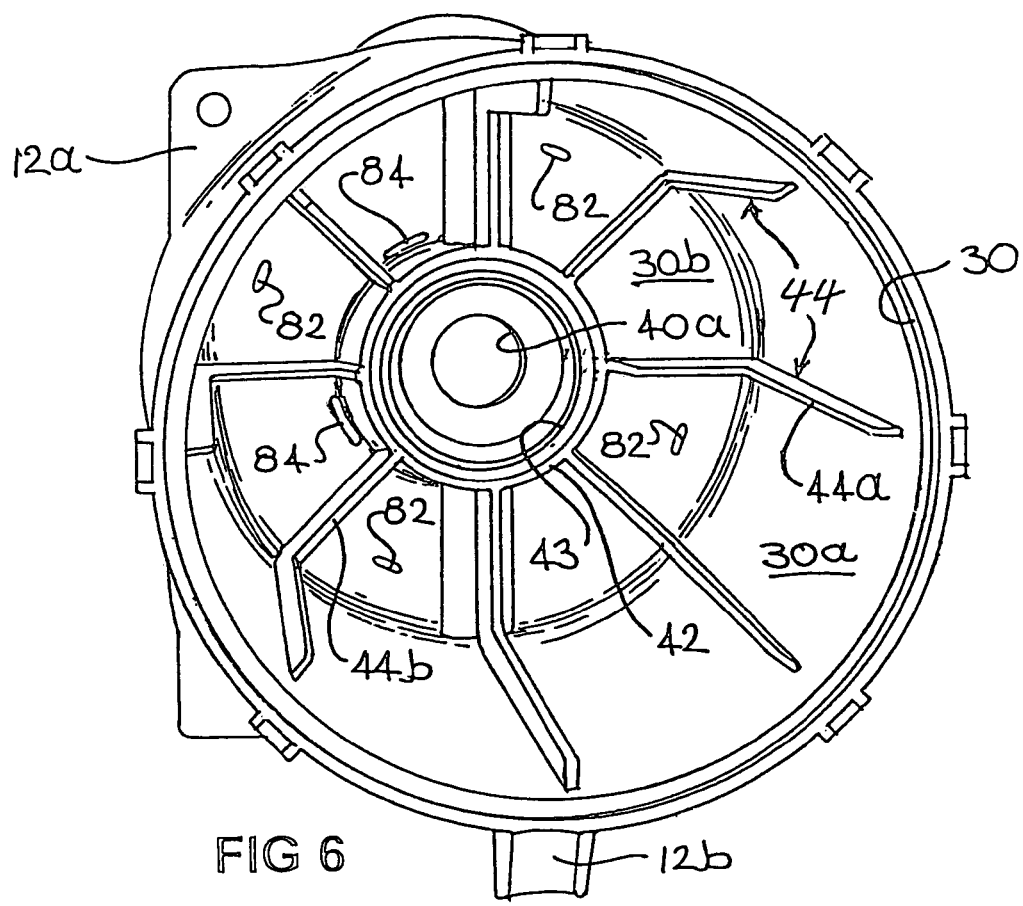
FIG. 6 is an internal perspective view of a housing component of the pump of FIG. 1.

FIG. 6 shows the interior of main part 30 of outer shell 26, from the end of part 30 to which end cap 31 is to be interfitted. As seen most clearly in FIG. 6, part 30 has a circumferentially spaced array of baffles 44 formed integrally therewith. Each baffle 44 is of L-shape, and has a stem portion 44*a* which extends along a major part of the longitudinal length of wall 30*a* of part 30 and which is disposed in a respective radial plane of part 30. Each baffle 44 also has a head portion 44*b* which projects axially from wall 30*b* and which has a larger radial extent in the same plane as its stem portion 44*a*. Each stem portion 44*a* extends radially from wall 30*a* to section 24*a* of motor casing 24. Also, each head portion 44*a* extends axially to the end 24*b* of casing 24 nearer to sub-housing 16 and radially to the nearer one of walls 38. The baffles 44 thus sub-divide chamber 34 into a circumferential array of segments. However alternate stem portions 44*a* are shorter than their next adjacent neighbours such that successive pairs of the segments of chamber 34 are in communication adjacent the end of wall 30*a* remote from sub-housing 16.

Wall 30*b* of shell 26 has a peripheral skirt 46 which projects axially away from casing 24. The sub-housing 16 has a cylindrical peripheral wall 48 which, adjacent to sub-housing 12, has an open end which is received in skirt 46. Wall 30*b* thus forms a common partition wall between the sub-housings 12 and 16. At the other end of wall 48, sub-housing 16 has a transverse end wall 50. The sub-housing 16 defines a chamber 52 and providing communication with chamber 52, sub-housing 16 has an inlet connector 54 and an outlet connector 55. As shown, connectors 54 and 55 extend axially beyond wall 50, away from sub-housing 12, in diametrally opposed, parallel relationship.

The impeller 18 is mounted on and is rotatable with shaft 20 of motor 14, within chamber 52 of sub-housing 16. The impeller 18 is axially located within the open end of skirt 48 of sub-housing 16, adjacent to wall 30*b*. At the axial side of impeller 18 remote from sub-housing 12, chamber 52 is sub-divided by a part cylindrical skirt 56 and a penannular flange 58. The skirt 56 is integral with end wall 50 of sub-housing 16 and extends axially therefrom over part of the axial extent of skirt 48. The skirt 56 is part cylindrical since it defines an opening 56*a* which is in line with inlet connector 54. The flange 58 is integral with skirt 48 and skirt 56 and, while flange 58 extends across opening 56*a*, it has an opening 58*a* between its ends which is axially in line with outlet connector 55. Also, as shown, flange 58 is of shallow, somewhat frusto-conical form so as to be substantially parallel to an axially opposed surface of impeller 18 in radial directions. However, flange 58 has the form of a volute and, circumferentially, it varies in displacement away from the axially opposed surface of impeller 18 at a constant pitch angle.

The impeller 18 has a first annular plate 62 which is of shallow, frusto-conical form and, axially spaced from plate 62, it has a second annular plate 64. While plate 64 is flat over a major part of its width which is axially in-line with plate 62, it has an inner margin 64*a* which is turned slightly, in the axial direction of plate 62. Between plates 62 and 64, impeller 18 has a series of circumferentially spaced varies 66. The varies 66 are arcuate, so as to extend outwardly in a spiral array.

Within and spaced from the inner periphery of plate 62, impeller 18 has a central hub 68. A circumferential array of connectors, comprising vanes 70, secure plate 62 in relation to hub 68. In the arrangement shown, the vanes 70 are generally disposed in a plane perpendicular to shaft 20, although they can be inclined slightly with respect to such plane, while each vane 70 has its free edges relatively axially displaced with respect to that plane. With rotation of impeller 18, vanes 70 may be operable to assist axial flow of fluid, although vanes 70 may be neutral with respect to such flow.

Around the junction of vanes 70 with the inner periphery of plate 62, impeller 18 has a skirt 72 which projects axially away from plate 64. The skirt 72 is within and only slightly spaced from an end portion of skirt 56 remote from end wall 50 of sub-housing 16.

The hub 68 of impeller 18 has a central boss 69 which defines a bore 69*a* by which impeller 18 is mounted on shaft 20. Around boss 69, hub 68 has a concentric skirt 71, with boss 69 and skirt 71 merging at a dome-shaped end 68*a* of hub 68 which is axially beyond plate 62 in a direction away from plate 64. As shown, the skirt 71 extends axially beyond boss 69 towards wall 30*b* of part 30 of shell 26. Within skirt 71, there is received an end of a seal 74 provided on shaft 20 within chamber 52. The other end of seal 74 bears against wall 30*b*, around opening 41, and is received within an annular spigot 76 integral with wall 30*b* and projecting axially towards impeller 18.

Radially outwardly beyond spigot 76, wall 30*b* has a further annular spigot 78 which is integral therewith and projects axially towards impeller 18. The spigot 78 has an internal diameter which is slightly greater than the spacing between the respective external surface of walls 38, as seen most clearly in FIG. 3. Also, the spigot 78 axially overlaps with, and is closely adjacent to, an annular spigot 80 which is integral with second plate 64 of impeller 18 and which projects axially away from first plate 62, towards wall 30*b*.

A principal aspect of operation of pump 19 now will be described. For this, it is assumed that inlet connector 54 is coupled to a conduit from a supply outlet of fluid, such as water, which is to be pumped; connector 55 is coupled to a return conduit for the fluid, and that motor 14 is operating to rotate impeller 18. With that operation, fluid enters a bore 81 defined by inlet connector 54, and flows in chamber 52 inwardly across flange 58 and through opening 56*a* of skirt 56. In the portion of chamber 52 within skirt 56, the fluid is presented across the domed end of 68*a* of hub 68 and flows axially through the array of vanes 70 into the space between plates 62 and 64 of impeller 18. From that space, the fluid is forced by the vanes 66 between the plates 62 and 64, so as to be forcefully pumped outwardly between the outer periphery of plates 62 and 64. Beyond, the outer periphery of plates 62 and 64, the fluid is constrained to flow around an annular, relatively high pressure region 52*a* of chamber 52, defined by wall 30*b*, flange 58 and the portion of wall 48 therebetween. From region 52*a*, the fluid discharges under the prevailing high pressure through opening 58*a* in flange 58, and then via a bore 83 defined by outlet connector 55.

In the description of the principal aspect of operation of pump 10, the flow of pumped fluid is facilitated principally by the action of vanes 66. Vanes 70 may assist slightly to force the fluid axially, although the principal function of vanes 70 is as connectors securing plate 62 to hub 68 and, hence, in relation to plate 64. The vanes 66 act to spiral the fluid outwardly away from a central region 52*b* adjacent to the free end of skirt 71 of hub 68. While fluid in that central region 52*b* therefore is pressurised, the region 52*b* is one low pressure relative to that in region 52*a*.

Between second plate 64 of impeller 18 and wall 30*b*, the pressures prevailing in regions 52*a* and 52*b* are substantially isolated. This is due to the closely adjacent, axially overlapping spigots 78 and 80 of wall 30*b* and plate 64, respectively. This substantial isolation enables a second aspect of operation of pump 10 by which some of the fluid being pumped is circulated through chamber 34 to control the operating temperature of motor 14. For this, there is formed in wall 30*b* an angularly spaced array of radially outer openings 82 (see FIGS. 3 and 6), and also an angularly spaced array of radially inner openings 84 (see FIGS. 2 and 6).

The respective arrays of openings 82 and 84 provide communication between chamber 52 of sub-housing 16 and chamber 34 within sub-housing 12. As shown in FIG. 6, the array of openings 82 is angularly offset from the array of openings 84. The arrangement is such that the communication is via a respective one of openings 82 and 84 for each of the sectors of chamber 34 defined by baffles 44, with the communication for each alternate sector being via a respective opening 82 and that for each other, adjacent sector via a respective opening 84. Thus, some of the liquid in the relatively high pressure region 52*a* is able to pass through each opening 84 into the respective alternate sectors for which those openings provide communication. From the openings 82, the fluid is able to circulate between the heads 44*b*, and longitudinally between the legs 44*a*, of the baffles 44 defining those alternate sectors. The longitudinal flow continues to the end of shell 26 remote from the sub-housing 16. As one of the legs 44*a* for each of the alternate sectors is shorter than the other, the fluid is able to flow around the remote end of the shorter leg 44*a* and to flow back towards sub-housing 16 in an adjacent sector. The return flow of fluid passes radially between the heads 44*b* of the baffles 44 defining each of the adjacent sectors, and passes through the respective opening 84 to the relatively low pressure region 52*b*.

The flow of fluid through the sectors of chamber 34 maintains the fluid in good thermal contact with the casing 24 of motor 14. Thus excess heat energy generated by motor 14 is able to be extracted by the fluid, through casing 24 over substantially the full axial length of central sector 24*a* of casing 24, as well as from the end 24*b* of casing 24 which is nearer to sub-housing 16. The size of openings 82 and 84 is selected to achieve a required flow rate of fluid through the sectors whereby the operating temperature of motor 14 is able to be controlled to a suitable level. Thus, overheating of motor 14 is able to be avoided, while it is able to be maintained at a temperature appropriate for its efficient operation.

As indicated, the connectors 54 and 55 are in diametrically opposed, parallel relationship. As shown in FIGS. 2 and 3, the respective bore 81 and 83 of connectors 54 and 55 is enlarged at its outer end 81*a* and 83*a* to define a frusto-conical seat 81*b* and 83*b*. Also, each connection is externally threaded, as shown at 81*c* and 83*c*, respectively. In each case, the arrangement is such that a respective conduit can be releasably coupled to each of the connectors. Thus, as shown in FIG. 3 for outlet connector 55, the conduit 83*d* is received with a neat fit within bore 83, beyond the seat 83*b*. A seal 89 on conduit 83*d* then is in position against the seat 83*b*. A nut 91, having a trailing peripheral flange 91*a* then is tightened onto the thread 86*c*, to compress the seal 89 into a fluid-tight fit between connector 55 and its conduit 83*d*. The situation is the same for inlet connector 54 and its conduit (not shown).

In FIG. 3, nut 91 is shown as tightened. Thus seal 89 illustrates its compressed form. In its uncompressed condition, the seal has a cross-section which has the form of a tetragon with parallel inner and outer sides and, at its axial ends, a respective side which is complementary to the opposed face of seat 83*b* and the inner face of flange 91*a*. As the nut 91 is tightened, seal 89 is axially compressed, thereby urging its outer surface into a fluid-tight engagement within end 83*a* of bore 83 and its inner surface into fluid-tight engagement with conduit 83*d*. Again, the situation is the same for the seal for inlet connector 54 and its conduit.

The pump 10 has a number of practical benefits. One of these is the overall compact design. A feature enabling this is the form of impeller 18 which enables seal 74 to be recessed therein. As seal 74 is substantially within the axial extend of impeller 18, it is able to be of a suitable axial length for efficient sealing or shaft 20 without significantly increasing the axial extent of pump 10.

A further practical benefit of pump 10 is provided by vertical vent 36. This enables any fluid which passes seal 74 from chamber 52 to drain out of sub-housing 12, substantially eliminating the risk of the fluid passing to and through the adjacent bearing 28 and into casing 24. Also, air is able to circulate through vent 36, thereby enabling the section of shaft 20 in vent 26 to be kept substantially dry. However, the vent 36 preferably is plumbed to waste at its lower end.

The form of impeller 18 facilitates attainment of an efficient pumping action. The interaction of impeller 18 with sub-housing 16 enhances this, while that interaction also enables fluid flow for control of the operating temperature of motor 14. Thus, for example, a close fitting of skirt 72 of impeller 18 within the end section of skirt 56 facilitates the flow of fluid within skirt 56 being drawn through rather than around skirt 72. This may be assisted by the action of vanes 70, but principally is due to the higher pressure prevailing in region 52*a* relative to region 52*b*. Similarly, the close inter-fitting between spigot 78 of wall 30*b* and spigot 80 of impeller 18 enables maintenance of a sufficient pressure differential between regions 52*a* and 52*b*. It is not necessary that skirt 72 being in contact with the end portion of skirt 56, or for spigots 78 and 80 be in contact. Indeed, given that impeller 18 is to rotate, wear would result in loss of such contact, while manufacturing tolerances would make difficult the attainment of suitable sliding contact. Rather, the respective fittings are to be such as to generate sufficient resistance to flow as to ensure flow though skirt 72 and maintenance of the pressure differential. The pressure differential and the provision of openings 82 and 84 in wall 30, enable efficient flow of fluid into chamber 34 for control of the operating temperature of motor 14.

Figure 7:
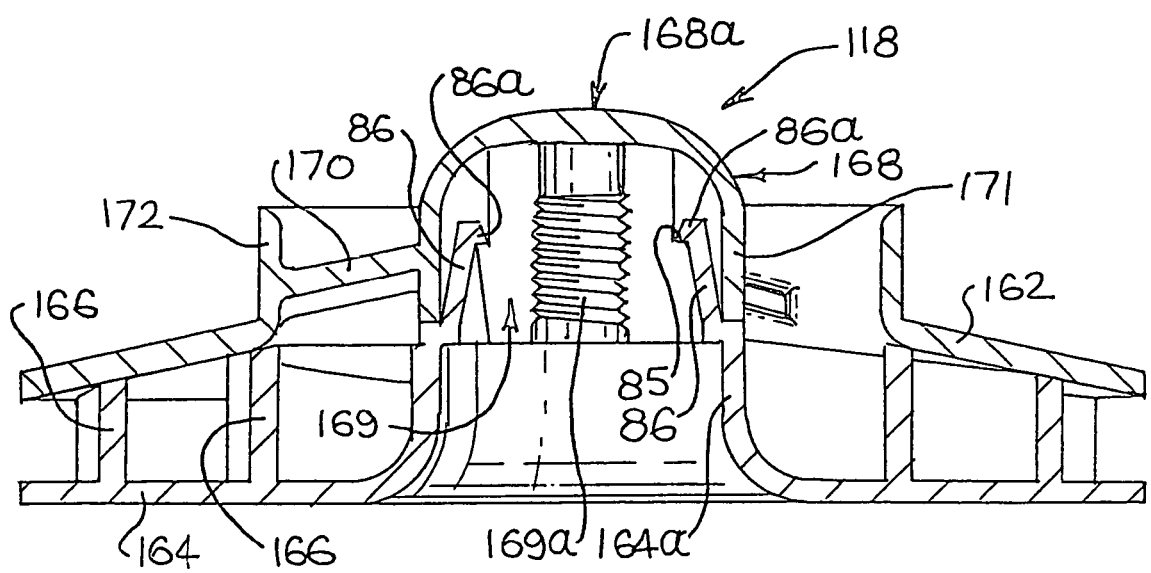
FIG. 7 is an axial sectional view of a further embodiment of an impeller according to the invention.

Turning now to FIG. 7, the impeller 118 shown therein has an overall form corresponding to that of impeller 18 shown in FIGS. 2 to 5. The parts of impeller 118 corresponding to those of impeller 18 have the same reference numeral, plus 100. Thus, impeller 118 has first annular plate 162, axially spaced from second annular plate 164. Between plates 162 and 164, impeller 118 has a series of circumferentially spaced vanes 166 which are arcuate and extend outwardly in a spiral array. The vanes 166 partially overlap such that the outer end of one is spaced radially outwardly from the inner or leading end of a next vane. Also, in this instance, the vanes 166 are formed integrally with plate 164 and abut the nearer surface of plate 162.

Within and spaced from the inner periphery of plate 162, impeller 118 has a central hub 168. Radial connectors in the form of vanes 170, inclined slightly from a plane perpendicular to the axis of impeller 118, secure plate 162 in relation to hub 168. Vanes 170 are at least neutral with respect to initial axial flow of fluid on rotation of impeller 118. As shown, an annular skirt 172 projects from the inner periphery of plate 162, away from plate 164. The vanes 170 join hub 168 to plate 162 via the skirt 172. The hub 168 has a central boss 169 which defines a threaded bore 169*a* by which impeller 118 is mountable on a motor output shaft for rotation therewith. Around boss 169, hub 168 has a concentric skirt 171, with hub 168 and skirt 171 merging at domed end 168*a*.

The boss 169, unlike other structure of impeller 118 in the plane of FIG. 7, is shown unshaded. This is because, in the arrangement shown, boss 169 is split in that plane to define two portions, each of substantially semi-cylindrical form, although such split need not be provided. The outer surface of each portion defines a peripheral ledge 85 for use in securing plate 164 in relation to plate 162. For this securement, the inner periphery of plate 164 is turned to define an annular skirt 164*a* from the end of which a plurality of hooked fingers 86 project away from plate 164. The outer surface of boss 169 tapers inwardly from ledges 85, in a direction away from end 168*a* such that as plate 164 is presented axially towards plate 162, the fingers 86 are able to ride over that surface to locate their hooked ends 86*a* behind ledges 85. The portions of boss 169 are able to flex towards each other, while the fingers 86 also are able to flex outwardly to facilitate this engagement. On attaining that engagement, skirts 171 and 164*a* are brought into and held in end to end abutting relationship as shown while, as indicated above, vanes 166 on plate 164 abut against plate 162.

The arrangement of impeller 118 is such that, while it overall is of complex form, it is readily able to be assembled from two parts each of more simple form. Also, the snap engagement between fingers 86 and boss 169 obviates the need for a further operation involved with the friction welding used for the components of impeller 18 of FIGS. 2 to 5. Moreover, while separation of the components of impeller 118 can be difficult, at least without special tools, separation is not likely to be necessary.

Figure 8:
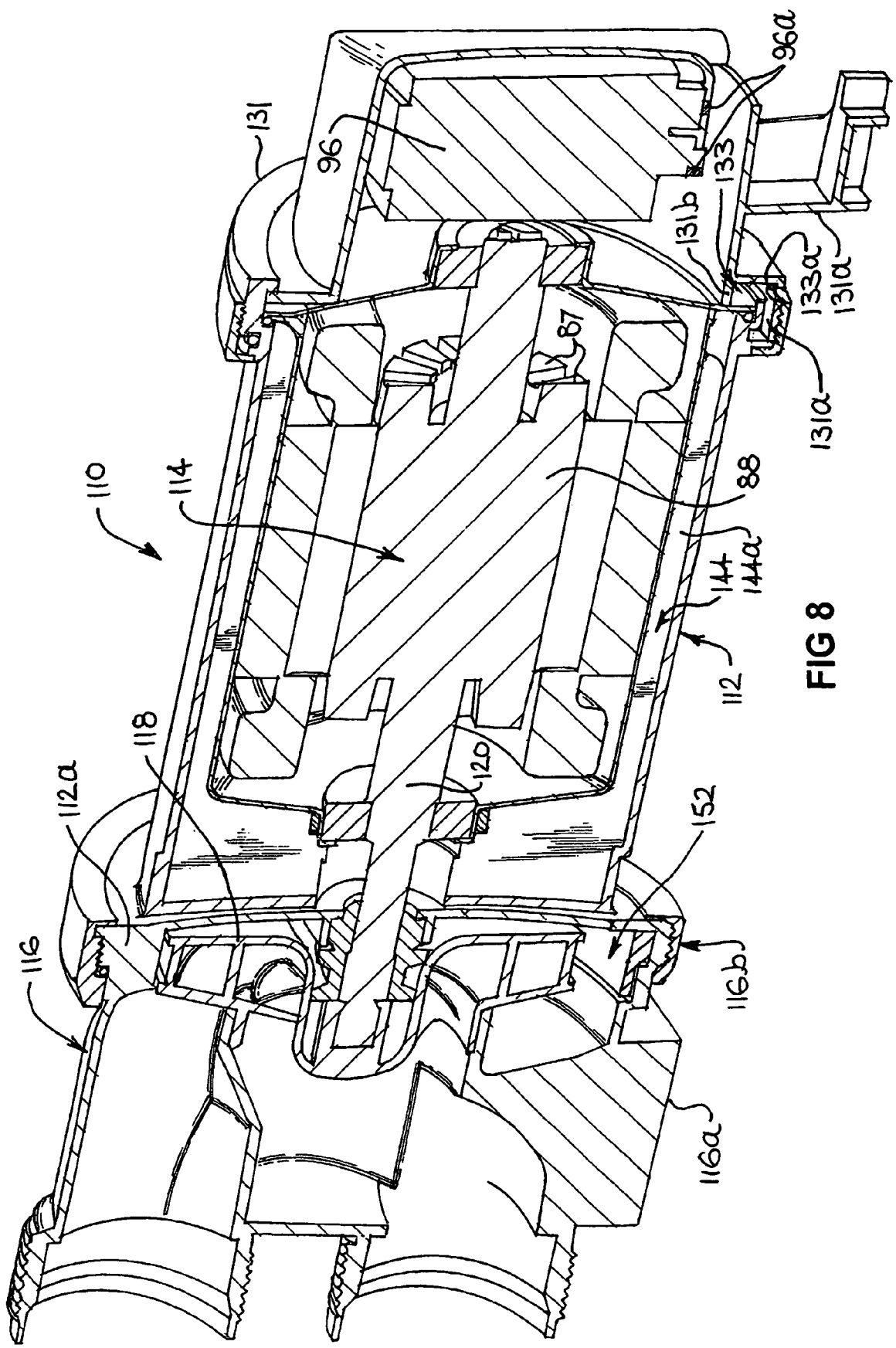
FIG. 8 is a schematic representation of an axial sectional view of a further embodiment of a pump according to the invention.

The pump 110 of FIG. 8 in large part is similar to pump 10 of FIGS. 1 to 3. Corresponding parts have the same reference numeral, plus 100. Thus, pump 110 has a first sub-housing 112 in which electric motor 114 is mounted and a second sub-housing 116 in which an impeller 118 is mounted on rotor shaft 120 of motor 114. The impeller 118 is as shown in FIG. 7, although it could be of the form of impeller 18 of FIGS. 2 to 5.

The coupling between sub-housings 112 and 116 differs in that it is of annular form. Also, sub-housing 112 has a thickened flange 112*a* within which impeller 118 is located and which is received within stepped flange 116*b* of sub-housing 116. Also, at its other end, sub-housing is not provided with a support bracket (corresponding to bracket 12*b* shown in FIG. 2). Rather, a support bracket 131*a* is provided with end cap 131 such that pump 110 is able to stand on bracket 131*a* and bracket 116*a* of sub-housing 116.

In most other respects, pump 119 as shown in FIG. 8 is similar to pump 10 of FIGS. 1 to 3. However, for ease of illustration, some structure of sub-housing 112 between outer shell 126 and motor casing 124 is not shown, although it is similar to that described with reference to pump 10 of FIGS. 1 to 3. Thus, while not shown, sub-housing 112 includes a vertical vent, corresponding to vent 36, while fluid flow between baffles 144 is enabled by openings corresponding respectively to openings 82 and 84 of pump 10 of FIGS. 1 to 3, as shown by openings 182 and 184 in FIG. 9. Thus pump 119 enables circulation of cooling water, to extract heat energy from motor 114, in essentially the same manner as with motor 10.

As with motor 10 of FIGS. 1 to 3, pump 110 enables heat energy extraction from the full axial extent of the peripheral wall 124*a* of casing 124 as well as from the end wall 124*b* of casing 124 nearer to sub-housing 116. In general, this is sufficient to control the operating temperature of motor 114. To the extent that this is not the case, pump 110 provides for further cooling at the end of motor 114 remote from sub-housing 116.

For the further cooling, pump 110 includes means 87 on the rotor, at the end of motor 114 remote from sub-housing 116 (but optionally at each end) for circulating air within casing 124 around and through motor 114. In the arrangement shown, the means 87 comprises a castellated formation on the end of the rotor core 88. However, means 87 could comprise fins or the like on rotor shaft 120. In each case, the means 87 functions to eliminate possible hot-spots by heat energy being taken up by circulating air and thereby facilitating maintenance of a relatively uniform temperature in all parts of motor 114. If required, vents communicating between the interior of motor casing 124 and the interior of end cap 131 can be provided in the end wall 124*b* adjacent to cap 31, to enable fresh cooling air to be drawn into casing 124 from end cap 131.

Figure 9:
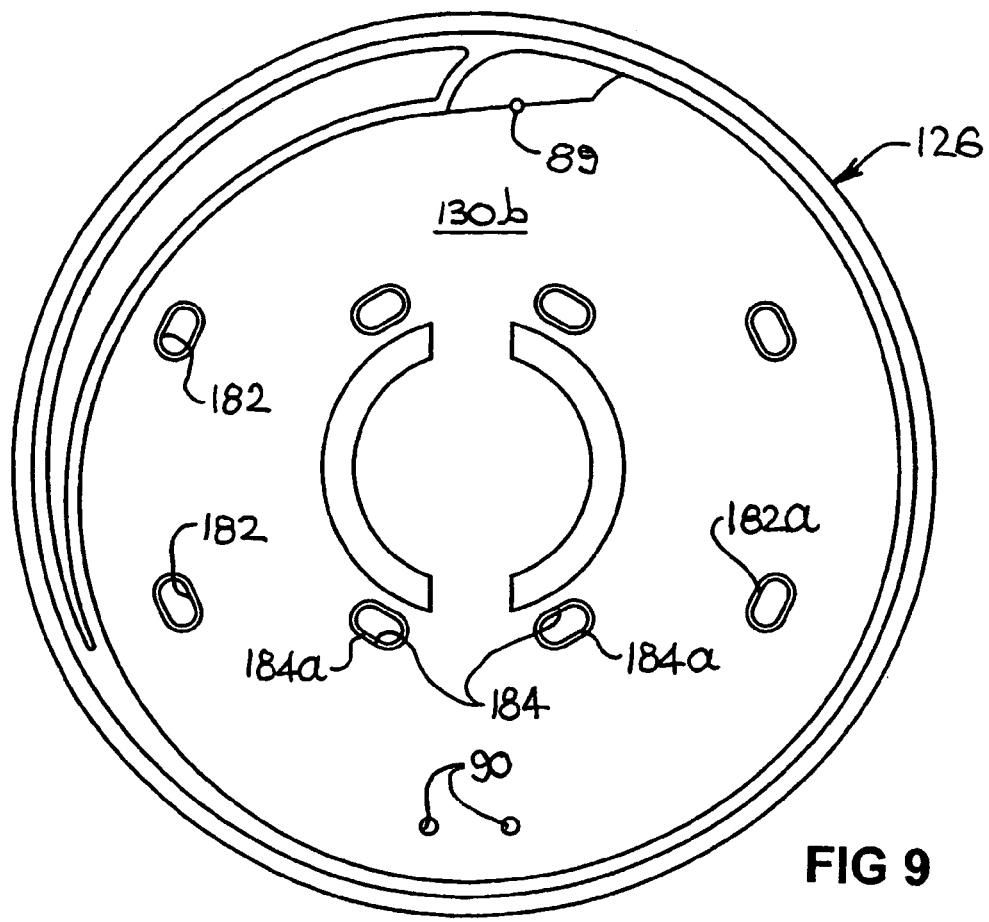
FIG. 9 is a view similar to FIG. 6, but in respect of a housing component of the pump of FIG. 8.

For ease of illustration, FIG. 9 shows only selected detail on the outer shell 126 of sub-housing 112 of rotor 110. The detail is in relation to end wall 130*b* of shell 126. Thus not shown, for example, are baffles corresponding to baffles 44 of outer shell 26 of motor 10 of FIGS. 1 to 3.

As shown in FIG. 9, end wall 130*b* has radially outer openings 182 and radially inner openings 184 therethrough. These provide communication between respective high and low pressure regions of the chamber 152 of impeller housing 116 and the interior of shell 126 to enable circulation of cooling water around motor casing 124. Thus, the operating temperature of motor 114 is able to be controlled in the same manner as described in relation to motor 14 of pump 10 of FIGS. 1 to 3.

Figure 10:
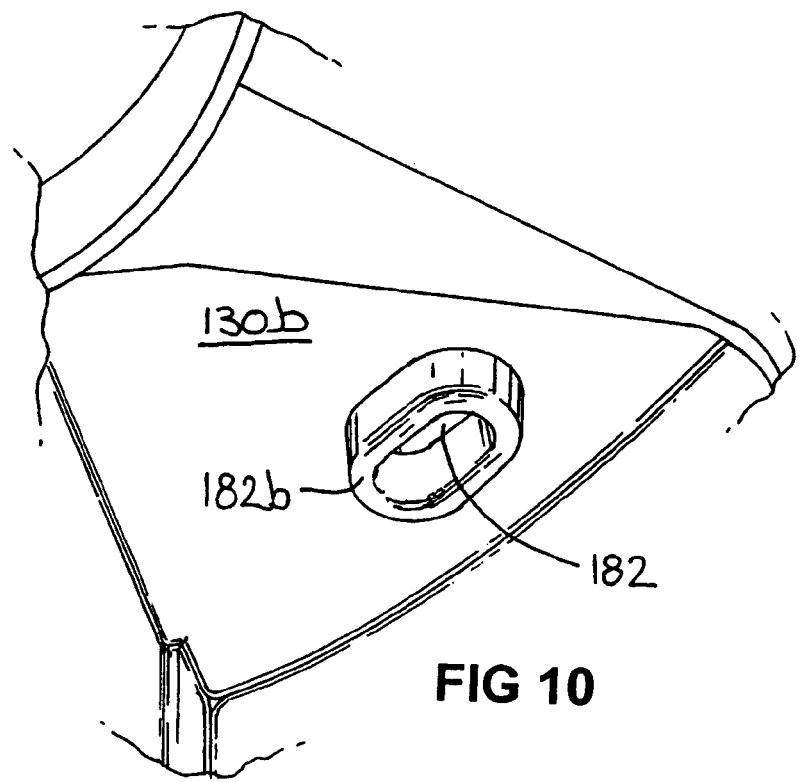
FIG. 10 is a perspective view of detail of the housing of FIG. 9.
Figure 11:
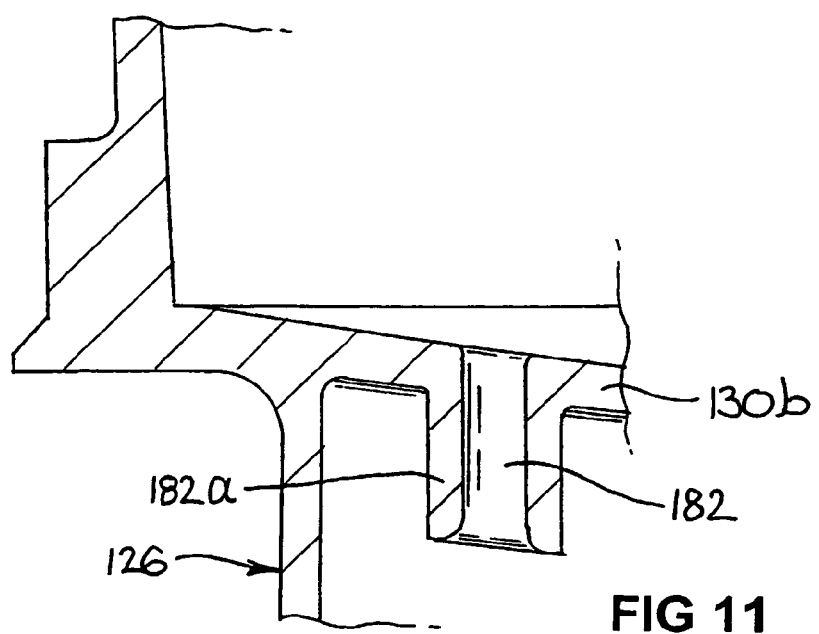
FIG. 11 is a sectional view of the detail shown in FIG. 10.

The radial location, number, and size of openings 182 and 184 is selected to provide a required flow rate of cooling water around motor casing 124 appropriate for maintaining a sufficient level of heat energy extraction from casing 124. Also, the shape of openings 182 and 184 is selected so as to minimise noise generated by water flow therethrough. As shown in FIG. 9, the openings are of circumferentially elongate form. Also, the openings 182 and 184 are axially elongated by provision of short, tubular extensions 182*a* and 184*a* as shown in detail in FIGS. 10 and 11 for openings 182. The extensions 182*a* and 184*a* are formed integrally with wall 130*b*. In the arrangement shown, each extension 182*a* and 184*a* projects within shell 126, although they all may extend into chamber 152. Alternatively, if required, openings 182*a* may extend oppositely to openings 184*a*, but with openings 182*a* most preferably extending within shell 126.

As also shown in FIG. 9, a vent hole 89 is provided in the upper extent of wall 130*b*. Thus, air in shell 126 on start-up of pump 110 is able to be displaced into the vertical vent (not shown, but corresponding to vent corresponding to vent 36 of FIGS. 2 and 3).

The flange 116*a* and bracket 131*a* are such that, with pump 110 standing on a horizontal support surface, the axis of pump 110 is inclined downwardly at a small angle to the horizontal, such as at an angle of about 3°, towards sub-housing 116. This enables water in pump 110 to drain out after motor 114 has been turned off. To facilitate drainage of water from shell 126, drainage holes 90 are provided in the lower extent of wall 130*b*. Thus, water in shell 126 is able to flow back into chamber 152, with air returning to shell 126 via vent hole 89. Also water in chamber 152 is able to drain via outlet bore 183.

The arrangement of pump 10 of FIGS. 1 to 3 (and of pump 110 of FIG. 8) is intended to extract heat energy from motor casing 24 (124). By this means, the temperature of motor 14 (114) is prevented from building up, and the operating temperature of the motor is able to be controlled. The heat energy is taken up by the water circulated from the impeller chamber 52 (152), through shell 26 (126) and then back through chamber (52 (152) before being discharged from pump 10 (110). Where, for example, the pump is utilized to provide recycling of water to the jets of a spa bath, heating of water discharged from the pump can be of benefit in maintaining the bath temperature at a suitable level. Indeed, there can be benefit in increasing the level of heat energy taken up by the recycled water, and FIG. 12 shows an arrangement suitable for this.

Figure 12:
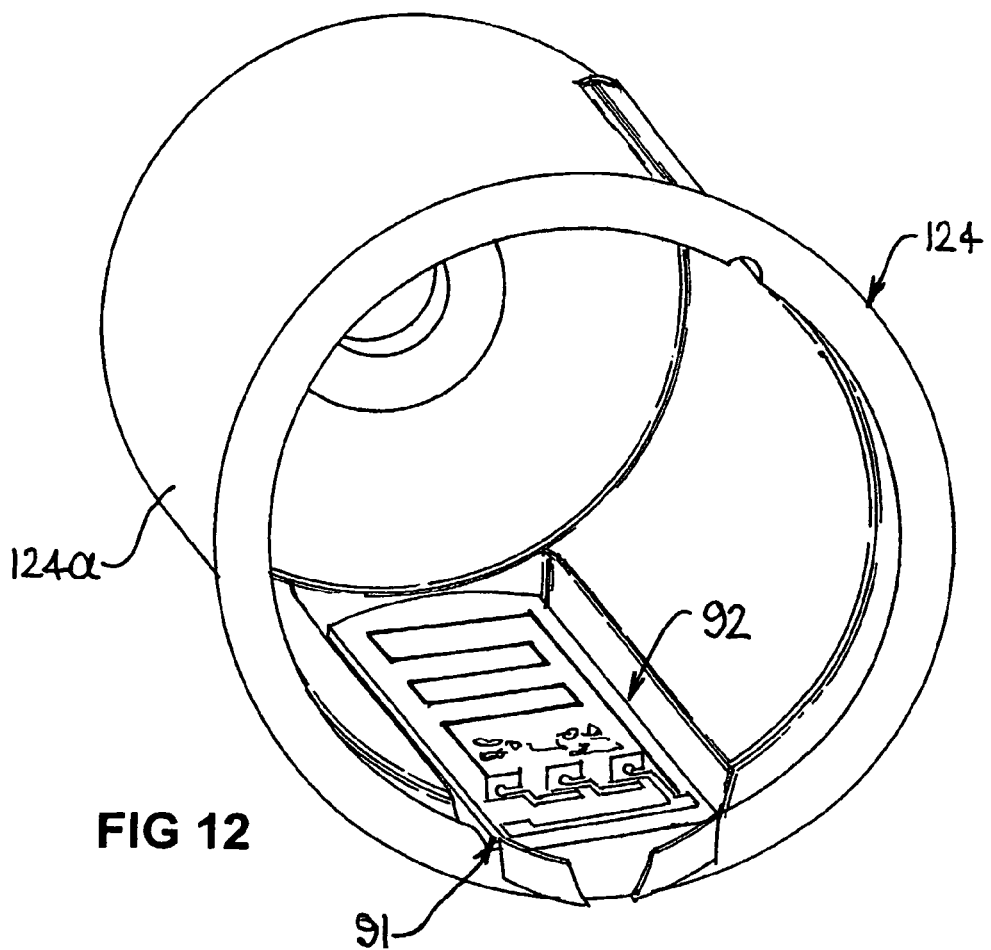
FIG. 12 is a perspective view from one end of a motor casing for use in a pump according to the invention, showing a first modified arrangement.

FIG. 12 shows an internal perspective view of a first modified arrangement for motor casing 124 for pump 110 (although a similar modification is possible for casing 24 of pump 10). The view of FIG. 12 is from the end of casing 124 at which end cap 131 of sub-housing 116 is secured. While having a generally cylindrical central section 124*a,* casing 124 is modified to enable a heater device 91 to be fitted therein. As shown, a part of section 124*a* is pressed outwardly to define a longitudinally elongate, rectangular recess 92 in which device 91 is mounted. The device 91 comprises a stainless steel substrate having a ceramic overlay on which a strip heating element with associated electronic control circuitry is provided, such as by screen printing. Thus, additional heat energy is able to be generated at, and transferred to, the part of casing section 124*a* at which recess 92 is defined. Control of the additional heat energy level enables regulation of the total heat energy level able to be taken up by the circulated water. Thus a body of water in the spa bath, for which pump 110 is being used to recycle water to jets of the spa bath, is able to be maintained at a required temperature level.

Figure 13:
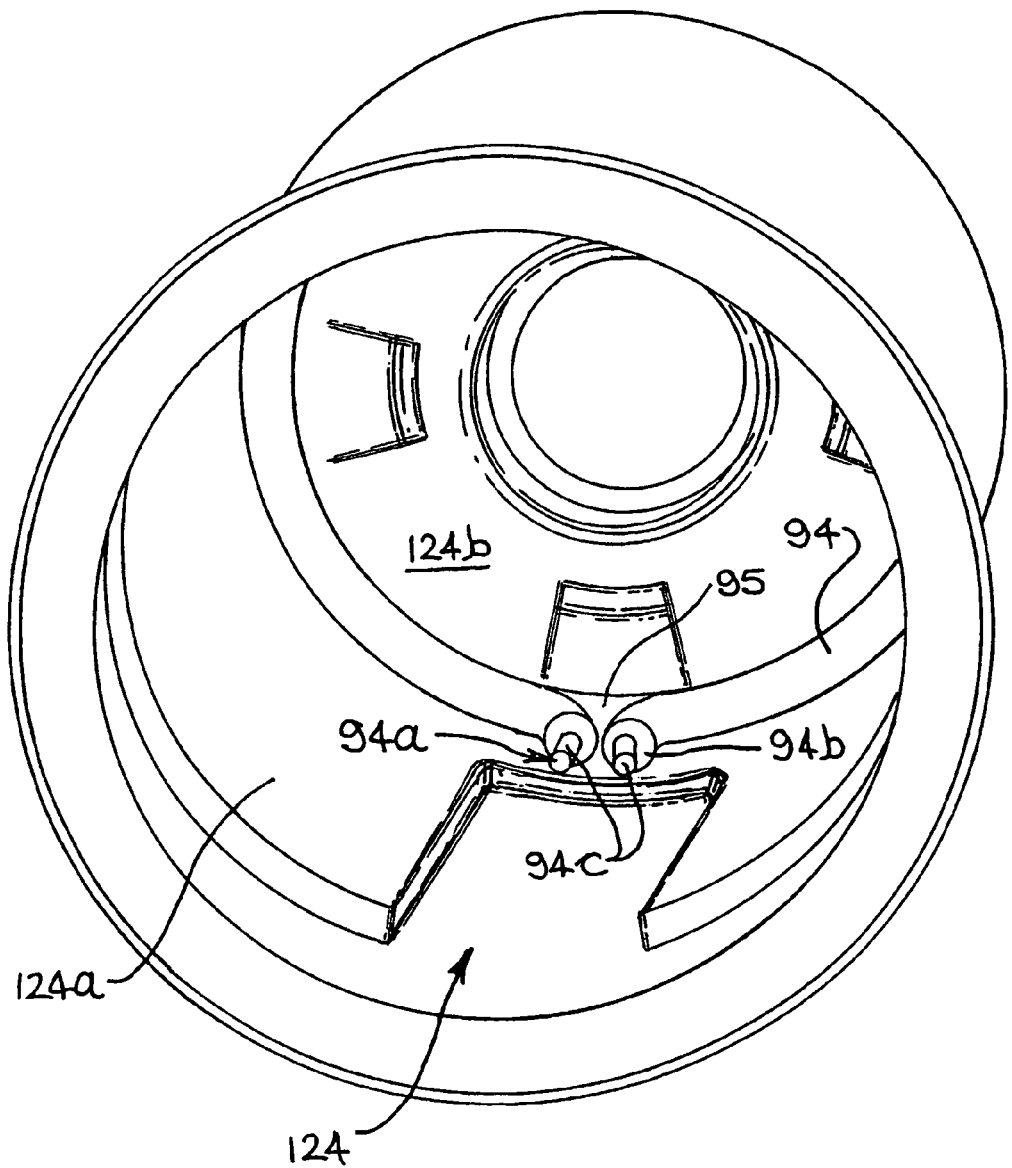
FIG. 13 is similar to FIG. 12, but is in respect of a motor casing showing a second modified arrangement enabling heating of water.

FIGS. 13 and 14 show internal perspective views of a second modified arrangement for motor casing 124 of pump 110 (although, again, a similar modification is possible for casing 24 of pump 10). In FIG. 13, the casting 124 is shown without motor 114. However, FIG. 14 shows motor 114, its shaft 120, rotor core 88 and stator 88*a* in schematic outline.

FIGS. 13 and 14 differ from FIG. 12 in the type and form of heating element provided. Rather than the arrangement of FIG. 12, FIGS. 13 and 14 show a resistance heating element 94 which extends around the junction of cylindrical wall 124*a* of casing 124 and its end wall 124*b* which, in pump 100, is adjacent to sub-housing 116. The junction of walls 124*a* and 124*b* define an annular channel 95 in which element 94 is received in good surface to surface contact to facilitate the transfer of heat energy from element 94, through the thickness of casing 124 defining channel 95, to water circulating over the external surface of casing 124. As seen most clearly in FIG. 13, heating element 94 is formed from an elongate resistance heating material 94*a* housed in an electrically insulating sheath 94*b*. Element 94 is of substantially toroidal form to fit in channel 95, with respective ends 94*c* of heating material 94*a* adjacent and projecting axially for connection to power supply leads (not shown). The power supply leads extend axially within casing 124, between wall 124*a* and stator 88*a,* and through the end (not shown) of casing 124 remote from element 94 to power supply terminals (not shown but corresponding to terminals 96*a* of power supply component 96 shown in FIG. 8). The component 96 supplies electric power for operating motor 114, as well as for heating element 94.

As will be appreciated, maintenance of the temperature of the body of water of a spa bath necessitates only sufficient heat energy to offset natural cooling of the water. With a motor having a power rating of 500 W, a substantial part of this requirement is available from heat energy generated by the motor in excess of that necessary for maintenance of the motor at an efficient operating temperature, particularly given that pumps usually are mounted in an enclosure. Indeed, providing adequate ventilation for the pump usually is a problem. However, with take-up of that excess heat energy by circulating water, further heating for maintenance of water temperature by the heating device can be relatively minor and, particularly where this is the case, the control circuitry for the heating device can be operable to power the device only as required to maintain the circulating water within a predetermined temperature range.

With a system supplying heated water, it is a normal requirement for the system to have a thermostat controlling maximum permissible water temperature, such as to a level of 40° C. for example. However, despite the provision of a thermostat for this purpose, it is possible for water in the pump to exceed that level substantially, despite power to the pump being cut-off, due to the substantial heat energy capacity of the motor. To safeguard against the pump being re-started while holding over-heated water, there preferably is a second thermostat which disables the pump, so as to necessitate its resetting, if a second temperature, such as 50° C. is exceeded. Where a heater device is provided, its circuitry may include a switch by which both the pump and the heater device are resettable after sufficient cooling of over-heated water in the pump.

Finally, it is to be understood that various alterations, modifications and/or additions may be introduced into the constructions and arrangements of parts previously described without departing from the spirit or ambit of the invention.

The invention claimed is:

1. A fluid pump of the type in which a housing assembly has a first sub-housing having an electric motor therein which is in line with a second sub-housing having an impeller therein, with the motor having a rotor shaft which extends through a seal of the first sub-housing into the second sub-housing and with the impeller mounted on the rotor shaft so as to be rotatable by the motor, and the second sub-housing having inlet and outlet ports through which fluid, such as water, is able to be pumped through the second sub-housing:

wherein the first sub-housing containing the motor is of double-walled construction enabling fluid cooling of the motor, with the double-walled construction provided by a motor casing which houses a stator and the rotor shaft of the motor and by an outer shell spaced from and enclosing the motor casing;

wherein, within a chamber of the first sub-housing defined between the casing and shell, there is provided a plurality of elongate baffles for guiding cooling fluid for flow over a major part of the external surface of the casing whereby the operating temperature of the motor is able to be controlled by heat energy extracted by the fluid from the casing;

wherein the baffles are of a form providing for a flow of cooling fluid along substantially the full axial length of the motor casing;

wherein the baffles provide flow from a first end of the first sub-housing adjacent to the second sub-housing, along the casing to its second end and then back along the casing to the first end by there being alternating longer and shorter baffles, with the longer baffles extending substantially to the second end of the casing and the shorter baffles terminating short of the longer baffles at that second end, whereby cooling fluid is able to flow to the second end of the casing between alternate pairs of baffles, and then pass around the end of each shorter baffles of each pair for return flow to the first end of the casing between next adjacent pairs of baffles; and wherein the first sub-housing has a transversely extending drainage vent which is located at the end of the first sub-housing adjacent to the second sub-housing, the vent extends from the shaft and opens to at least one of opposed sides of the first sub-housing and is located between a respective end wall of the outer-shell of the first sub-housing and of the motor casing, and the transverse extent of the vent is defined by the end wall of the outer shell, a transverse pair of opposed side wall members and a transverse basal wall member which extends between the side wall members, and the shaft extends from the motor casing between the side wall members and through the basal wall member and the end wall.

2. The pump of claim 1, wherein the second sub-housing includes an inlet connector for coupling the pump to a supply conduit from a source of fluid to be pumped, and an outlet connector for coupling the pump to a return conduit; each connector communicates with the interior of the
 second sub-housing and is adapted to provide releasable coupling to the respective conduit in which:
 (i) each connector defines a bore extending between the interior of the second sub-housing and an outer end of the connector;
 (ii) an end portion of the conduit for each connector is receivable in the bore, either as a neat sliding fit or with a slight clearance;
 (iii) at the outer end of each connector, the bore is of larger size to define a seat against which a resilient seal is locatable, around the conduit; and
 (iv) a respective gland-type of nut on each conduit is engageable with an external thread formed on each connector such that, on tightening each nut, the respective seal is able to be compressed to secure the conduit in relation to the connector and provide a fluid tight seal between the conduit and the connector.

3. The pump of claim 2, wherein the connectors are disposed with their bores extending in substantially parallel relationship whereby some misalignment in the conduits, without leakage, is allowed.

4. The pump of claim 2, wherein the bores are substantially parallel to the rotor axis, and the connector extend from the second sub-housing in a direction away from the first sub-housing.

5. The pump of claim 2, wherein the outlet connector communicates with the interior of the second sub-housing with its bore substantially in line with the outer periphery of the impeller.

6. The pump of claim 2, wherein the bore of the inlet connector is aligned with the outer periphery of the impeller, and fluid flow from inlet connector to the interior of the second sub-housing is via a lateral opening from the bore of the inlet connector such that fluid passes to a central region of the impeller.

7. The pump of claim 1, wherein the baffles are of a form providing for a flow of cooling fluid along substantially the full axial length of the motor casing.

8. The pump of claim 1, wherein at the first end of the first sub-housing the chamber of the first sub-housing, defined between the casing and the shell, extends radially inwardly from the shell towards the rotor shaft, across an end of the casing adjacent to the first end of the first sub-housing.

9. The pump of claim 8, wherein the baffles have lateral portions which extend across the end of the casing from their main longitudinal extent to a central boss through which the shaft extends, whereby the cooling fluid is able to extract heat energy from the casing at the first end, as well as from substantially the full length of casing, to enhance overall heat extraction.

10. The pump of claim 9, wherein the chamber and the baffles extend radially inwardly from the shell, towards the shaft, across an end of the casing adjacent to the second end of the casing, to further enhance heat extraction.

11. The pump of claim 1, wherein the flow of cooling fluid is enabled by a plurality of inlet and a plurality of outlet ports for the chamber which provide communication between the interior of the impeller sub-housing and the chamber, with the inlet ports provided at a higher pressure region of the impeller sub-housing and the outlet ports provided at a lower pressure region of that sub-housing, whereby a pressure differential prevailing in the impeller sub-housing provides a force necessary to drive the cooling fluid into and along the chamber from the first to the second end of the motor sub-housing, and then back to the first end for return to the impeller sub-housing.

12. The pump of claim 11, wherein the inlet ports are disposed radially outwardly with respect to the outlet ports.

13. The pump of claim 11, wherein the ports are of a form free of sharp edges and have tubular extensions which project from a wall in which the ports are provided.

14. The pump of claim 1, wherein the motor includes means for stirring or circulating air in the motor casing around and through the motor, to assist in maintaining all parts of the motor at a relatively uniform temperature and, hence, to minimize generation of hot spots.

15. The pump of claim 14, wherein the means for stirring or circulating the air include formations on a rotor coil of the motor and/or the rotor shaft which are shaped to generate air circulation.

16. The pump of claim 15, wherein the formations are provided at at least one end of the motor to at least stir air at the at least one end of the motor.

17. The pump of claim 16, wherein the formations are provided at each end of the motor and the respective formations co-operate by generating air flow in the motor casing to cause the air to flow in one axial direction between the rotor and stator and in the opposite axial direction between the stator and the motor casing.

18. A fluid pump of the type in which a housing assembly has a first sub-housing having an electric motor therein which is in line with a second sub-housing having an impeller therein, with the motor having a rotor shaft which extends through a seal of the first sub-housing into the second sub-housing and with the impeller mounted on the rotor shaft so as to be rotatable by the motor, and the second sub-housing having inlet and outlet ports through which fluid, such as water, is able to be pumped through the second sub-housing:
 wherein the first sub-housing containing the motor is of double-walled construction enabling fluid cooling of the motor, with the double-walled construction provided by a motor casing which houses a stator and the rotor shaft of the motor and by an outer shell spaced from and enclosing the motor casing;
 wherein within a chamber of the first sub-housing defined between the casing and shell, there is provided a plurality of elongate baffles for guiding cooling fluid for flow over a major part of the external surface of the casing whereby the operating temperature of the motor is able to be controlled by heat energy extracted by the fluid from the casing;
 wherein the baffles are of a form providing for a flow of cooling fluid along substantially the full axial length of the motor casing;
 wherein the baffles provide flow from a first end of the first sub-housing adjacent to the second sub-housing, along the casing to its second end and then back along the casing to the first end by there being alternating longer and shorter baffles, with the longer baffles extending substantially to the second end of the casing and the shorter baffles terminating short of the longer baffles at that second end, whereby cooling fluid is able to flow to the second end of the casing between alternate pairs of baffles, and then pass around the end of each shorter baffles of each pair for return flow to the first end of the casing between next adjacent pairs of baffles;

wherein an annular fluid-tight seal is formed between the casing and shell at the second end;

wherein the seal is provided adjacent to the periphery of an end wall of the first sub-housing at the second end, and an electrical enclosure from which electrical power to the motor is received is provided beyond the second end; and wherein an annular drainage chamber is defined around the perimeter of the end wall such that any cooling fluid passing the seal is received in the chamber and wherein the drainage chamber has at least one drainage port by which cooling fluid received in the drainage chamber is able to pass to the exterior of the pump.

19. A fluid pump of the type in which a housing assembly has a first sub-housing having an electric motor therein which is in line with a second sub-housing having an impeller therein, with the motor having a rotor shaft which extends through a seal of the first sub-housing into the second sub-housing and with the impeller mounted on the rotor shaft so as to be rotatable by the motor, and the second sub-housing having inlet and outlet ports through which fluid, such as water, is able to be pumped through the second sub-housing;

wherein the first sub-housing containing the motor is of double-walled construction enabling fluid cooling of the motor, with the double-walled construction provided by a motor casing which houses a stator and the rotor shaft of the motor and by an outer shell spaced from and enclosing the motor casing;

wherein, within a chamber of the first sub-housing defined between the casing and shell, there is provided a plurality of elongate baffles for guiding cooling fluid for flow over a major part of the external surface of the casing whereby the operating temperature of the motor is able to be controlled by heat energy extracted by the fluid from the casing;

wherein the baffles are of a form providing for a flow of cooling fluid along substantially the full axial length of the motor casing;

wherein the baffles provide flow from a first end of the first sub-housing adjacent to the second sub-housing, along the casing to its second end and then back along the casing to the first end by there being alternating longer and shorter baffles, with the longer baffles extending substantially to the second end of the casing and the shorter baffles terminating short of the longer baffles at that second end, whereby cooling fluid is able to flow to the second end of the casing between alternate pairs of baffles, and then pass around the end of each shorter baffles of each pair for return flow to the first end of the casing between next adjacent pairs of baffles; and further including a heating device in the first sub-housing by which cooling fluid circulated therethrough is able to be heated to a required degree whereby, in addition to taking up heat energy from the motor, the fluid can be further heated such as to maintain fluid circulated by the pump at a required temperature level; and wherein the heater device is mounted in the motor casing.

20. The pump of claim 19, wherein the heater device comprises a substrate of a suitable steel with the substrate having ceramic overlay on which a heating element and control circuitry is provided, such as by printing.

21. The pump of claim 20, wherein the overlay, with the heating element and circuitry, is formed directly onto the motor casing.

22. The pump of claim 19, wherein the heater device includes a resistance heating element extending circumferentially with the motor casing.

23. The pump of claim 22, wherein the heating element is mounted adjacent to a junction between a peripheral wall of the motor casing and an end wall of the motor casing adjacent to the second sub-housing.

24. The pump of claim 23, wherein the motor casing defines an annular channel, around the junction, in which the heating element is mounted.

25. A fluid pump of the type in which a housing assembly has a first sub-housing having an electric motor therein which is in line with a second sub-housing having an impeller therein, with the motor having a rotor shaft which extends through a seal of the first sub-housing into the second sub-housing and with the impeller mounted on the rotor shaft so as to be rotatable by the motor, and the second sub-housing having inlet and outlet ports through which fluid, such as water, is able to be pumped through the second sub-housing:

wherein the first sub-housing containing the motor is of double-walled construction enabling fluid cooling of the motor, with the double-walled construction provided by a motor casing which houses a stator and the rotor shaft of the motor and by an outer shell spaced from and enclosing the motor casing; and wherein, within a chamber of the first sub-housing defined between the casing and shell, there is provided a plurality of elongate baffles for guiding cooling fluid for flow over a major part of the external surface of the casing whereby the operating temperature of the motor is able to be controlled by heat energy extracted by the fluid from the casing; and wherein the first sub-housing has a transverse vent which is located at the end of the first sub-housing adjacent to the second sub-housing and which opens to at least one of opposed sides of the first sub-housing and is located between a respective end wall of the outer-shell of the first sub-housing and of the motor casing; and wherein the vent is defined by the end wall of the outer shell, a transverse pair of opposed side wall members and a transverse basal wall member which extends between the side wall members, and the shaft extends from the motor casing between the side walls and through the basal and end walls.

26. The pump of claim 25, wherein the end wall of the outer shell comprises a partition wall which separates the sub-housings, and a seal is provided on the shaft to at least minimise leakage of fluid along the shaft from the second sub-housing.

27. The pump of claim 26, wherein the seal is housed in an annular spigot projecting axially from the outer shell end wall towards or within the first sub-housing.

28. The pump of claim 25 wherein, with the shaft extending horizontally and the vent disposed vertically and opening below the pump, the vent enables fluid which leaks from the second sub-housing or from the chamber of the first sub-housing to drain under gravity away from the shaft, thereby minimizing the risk of fluid passing along the shaft to the motor housing.

29. The pump of claim 28, wherein the lower end of the vent is plumbed to waste.

30. The pump of claim 25, wherein the vent is open at each of its ends and enables air-circulation around the portion of the shaft extending across the vent.

31. The pump of claim 25, wherein the side walls and the basal wall of the vent are formed integrally with the end wall of the outer shell of the first sub-housing, the basal wall defines a central opening to enable the shaft to extend therethrough and around that opening, at its face remote from the end wall of the outer shell, the basal wall defines an annular spigot with which a corresponding spigot on the end wall of the motor casing co-axially overlaps, a seal is provided between the overlapping spigots, and a bearing for the shaft is housed within the overlapping spigots.

32. A fluid pump of the type in which a housing assembly has a first sub-housing having an electric motor therein which is in line with a second sub-housing having an impeller therein, with the motor having a rotor shaft which extends through a seal of the first sub-housing into the second sub-housing and with the impeller mounted on the rotor shaft so as to be rotatable by the motor, and the second sub-housing having inlet and outlet ports through which fluid, such as water, is able to be pumped through the second sub-housing:

wherein the first sub-housing containing the motor is of double-walled construction enabling fluid cooling of the motor, with the double-walled construction provided by a motor casing which houses a stator and the rotor shaft of the motor and by an outer shell spaced from and enclosing the motor casing;

wherein, within a chamber of the first sub-housing defined between the casing and shell, there is provided a plurality of elongate baffles for guiding cooling fluid for flow over a major part of the external surface of the casing whereby the operating temperature of the motor is able to be controlled by heat energy extracted by the fluid from the casing;

wherein the flow of cooling fluid is enabled by a plurality of inlet and a plurality of outlet ports for the chamber which provide communication between the interior of the impeller sub-housing and the chamber, with the inlet ports provided at a higher pressure region of the impeller sub-housing and the outlet ports provided at a lower pressure region of that sub-housing, whereby a pressure differential prevailing in the impeller sub-housing provides a force necessary to drive the cooling fluid into and along the chamber from the first to the second end of the motor sub-housing, and then back to the first end for return to the impeller sub-housing;

wherein the inlet ports are disposed radially outwardly with respect to the outlet ports, wherein the number, size and radial location of the inlet and outlet ports enabling the flow of cooling fluid are chosen to attain a sufficient pressure differential between the inlet and outlet ports to achieve a flow of cooling fluid providing a suitable level of heat energy extraction from the motor casing for maintaining the motor at an efficient operating temperature and to ensure flow through each port which avoids undue generation of noise and vibrations; and wherein the first sub-housing has a transversely extending drainage vent which is located at the end of the first sub-housing adjacent to the second sub-housing, the vent extends from the shaft and opens to at least one of opposed sides of the first sub-housing and is located between a respective end wall of the outer-shell of the first sub-housing and of the motor casing, and the transverse extent of the vent is defined by the end wall of the outer shell, a transverse pair of opposed side wall members and a transverse basal wall member which extends between the side wall members, and the shaft extends from the motor casing between the side wall members and through the basal wall member and the end wall.

33. The pump of claim 32, wherein the impeller is configured so as to co-operate with a surface of the second sub-housing to assist in maintaining a pressure differential between higher and lower pressure regions in the second sub-housing.

34. The pump of claim 33, wherein the impeller has an annular spigot or fin which axially overlaps with, is closely adjacent to and co-operates with an annular spigot or fin of the second sub-housing.

35. The pump of claim 33, wherein at least one of the impeller and second sub-housing has a stepped surface which defines an annular face which axially overlaps, is closely adjacent to and co-operates with an annular face, spigot or fin of the other to assist in maintaining the pressure differential.

* * * * *